(12) United States Patent
Roffers et al.

(10) Patent No.: US 11,741,519 B2
(45) Date of Patent: Aug. 29, 2023

(54) END-CONSUMER CUSTOMIZABLE PRODUCT VARIETY PACK

(71) Applicant: Trilliant Food and Nutrition, LLC, Little Chute, WI (US)

(72) Inventors: Brian Roffers, Pulaski, WI (US); Mathew Luis Hudson, Appleton, WI (US); Andrew Carmelo Stadtlander, Appleton, WI (US); Daryl Marlin Berg, Pewaukee, WI (US)

(73) Assignee: Trilliant Food and Nutrition, LLC, Little Chute, WI (US)

( * ) Notice: Subject to any disclaimer, the term of this patent is extended or adjusted under 35 U.S.C. 154(b) by 646 days.

(21) Appl. No.: 16/527,923

(22) Filed: Jul. 31, 2019

(65) Prior Publication Data

US 2020/0043071 A1  Feb. 6, 2020

Related U.S. Application Data

(60) Provisional application No. 62/713,400, filed on Aug. 1, 2018, provisional application No. 62/712,679, filed on Jul. 31, 2018.

(51) Int. Cl.
*B65B 5/04* (2006.01)
*G06Q 30/0601* (2023.01)
*B65D 85/804* (2006.01)

(52) U.S. Cl.
CPC .......... *G06Q 30/0621* (2013.01); *B65B 5/04* (2013.01); *B65D 85/8055* (2020.05); *G06Q 30/0635* (2013.01)

(58) Field of Classification Search
USPC ........................................................ 209/595
See application file for complete search history.

(56) References Cited

U.S. PATENT DOCUMENTS

| | | | | |
|---|---|---|---|---|
| 4,382,527 A * | 5/1983 | Lerner | ................... | G01G 13/08 53/502 |
| 5,246,118 A * | 9/1993 | Mosher | ................ | G01G 13/026 177/52 |
| 5,522,512 A * | 6/1996 | Archer | ....................... | B07C 5/38 209/580 |
| 2004/0267675 A1* | 12/2004 | Burton | ................... | G06Q 10/08 705/400 |
| 2013/0144431 A1* | 6/2013 | Tidhar | .................... | B65B 5/103 700/231 |
| 2014/0027011 A1* | 1/2014 | Bahr | ........................ | A01C 1/00 209/552 |

\* cited by examiner

*Primary Examiner* — Chinyere J Rushing-Tucker
(74) *Attorney, Agent, or Firm* — Sheridan Ross P.C.

(57) ABSTRACT

A system for selecting and packaging a customized variety pack including an assortment of products including one or more servers configured to receive a custom order from a consumer for single serve coffee pods. The custom order comprises details specifying a total number of single serve coffee pods to include in the variety pack and a number of each of a plurality of different varieties of single serve coffee pods to include in the variety pack. The system further includes a labeling device configured to receive custom order information from the one or more servers, print a label with the custom order information, and attach the label to a box. The system further includes a packing machine configured to scan the label on the box, retrieve from the one or more servers the details for the variety pack, and deposit individual coffee pods into the box according to the details.

20 Claims, 23 Drawing Sheets

FIG.11

80 Count

Choose Your Mix

⊟ 11 ⊞ Variety 1
⊟ 29 ⊞ Variety 2
⊟ 10 ⊞ Variety 3
⊟ 14 ⊞ Variety 4

⊟ 10 ⊞ Variety 5
⊟ 9 ⊞ Variety 6
⊟ 10 ⊞ Variety 7
⊟ 10 ⊞ Variety 8

[ Add To Cart ]

Please Remove 23 Items

80 Count

Choose Your Mix

⊟ 11 ⊞ Variety 1
⊟ 20 ⊞ Variety 2
⊟ 1 ⊞ Variety 3
⊟ 14 ⊞ Variety 4

⊟ 1 ⊞ Variety 5
⊟ 9 ⊞ Variety 6
⊟ 1 ⊞ Variety 7
⊟ 10 ⊞ Variety 8

[ Add To Cart ]

Please Add 13 Items

ND-CONSUMER CUSTOMIZABLE PRODUCT VARIETY PACK

CROSS REFERENCE TO RELATED APPLICATION

This application claims priority to and the benefit of U.S. Provisional Appln. No. 62/712,679, filed on Jul. 31, 2018, and claims priority to and the benefit of U.S. Provisional Appln. No. 62/713,400, filed on Aug. 1, 2018, the disclosures of each of which are incorporated herein by reference in their entireties.

FIELD OF THE DISCLOSURE

This disclosure relates to processing customer generated orders for a variety of products and packaging said products for shipment to a customer.

BACKGROUND

Despite the access consumers now have to online shopping, consumers are often unable to personalize their on-line purchase of an assortment of related products they wish to buy. For example, while many products are offered in "variety packs" containing an assortment of different varieties of a given product, wherein the combination of individual varieties of product and the quantity of each product are typically predetermined by the manufacturer/supplier.

Using single serve coffee pods as an example, while the consumer may be able to purchase a box/package containing an assortment of different coffee types and/or flavors, the consumer's options are limited to purchasing the specific assortment(s) of product as selected and packaged by the coffee supplier—often based upon the supplier's belief as to which assortment(s) will have largest consumer demand. For example, a coffee supplier may offer a box of 24 coffee pods containing 12 regular and 12 decaf pods, or 24 coffee pods of 4 different flavors. A consumer is thus unable to select and purchase on-line the specific variety and quantities of flavors and/or flavors of the desired product to be packaged in a single box, or total overall quantity of coffee pods in a single box.

Existing graphical user interfaces (GUIs) used to place online orders are unable to accept truly customized orders for specific varieties and quantities of products to be packaged together. Attempting to use existing GUIs to provide customizable ordering for end-consumers may yield GUIs that are not intuitive to an end-consumer for placing an order having unique quantity sets.

Even if such orders could be received, present supplier-side product/order fulfillment centers are not adequate for dealing with large scale high-volume processing of highly customized end-consumer variety packs. Such difficulties arise due to the need to transmit large volumes of custom order data and the need to properly fulfill that order and then correlate each individual custom order to the correct consumer's address.

It is thus an object of the invention to provide for improved variety packs that may be customized, both with respect to total quantity of products in a package or box and also with respect to quantities of different varieties of products within the package or box.

Yet another object of the invention is to provide for a customizable variety pack that is fully and easily customizable by the end-consumer, such that the products within a package or box are packaged in accordance with custom orders placed by the end-consumer.

These and other objects of the invention will become apparent in light of the present specification, claims, and drawings.

SUMMARY OF THE INVENTION

The present invention relates to improved methods, systems, apparatuses, and computer readable media for receiving customized orders for product variety packs via improved computerized graphical user interfaces (GUIs) and accurate tracking and filling of customized orders once they are placed.

Custom variety pack orders are placed by end-consumers through the GUIs of a custom user facing portal. The GUIs provide a consumer the ability to select quantities of multiple product varieties and to select the total quantity of products. Those GUIs include quantity input logic and the additional logic for ensuring that an order is complete. Such a consumer interface includes quantity input logic, and additional logic to notify the user that more or less product need be selected for the order to be deemed complete. GUIs are provided with education for the end-consumer via descriptions of how to use a custom quantity tool and/or a user experience that provides clarity for custom orders in an intuitive manner.

The custom variety pack orders are received by a server as a digital communication, and an automated system subsequently creates a custom label for each order. The custom label is affixed to a shipping box or other packaging for the customized variety pack, so that the order may be fulfilled as a unique finished good. A variety packing machine scans the custom label of the box or packaging, determines the specific products needed for filling the order, and fills the shipping box or packaging with the proper quantities and types of each product. Once the box or packaging is filled according to the unique product order, the box or packaging is appropriately labeled to be shipped based on the information provided by the end-consumer who placed the order. Using the label, the box or packaging is then shipped to the end-consumer who placed the order (or to whomever the end-consumer designates to receive the order).

BRIEF DESCRIPTION OF THE DRAWINGS

FIGS. 11-15 are graphical user interfaces (GUIs) for placing a custom variety pack order according to various embodiments of the present invention.

DETAILED DESCRIPTION

Figure 1:
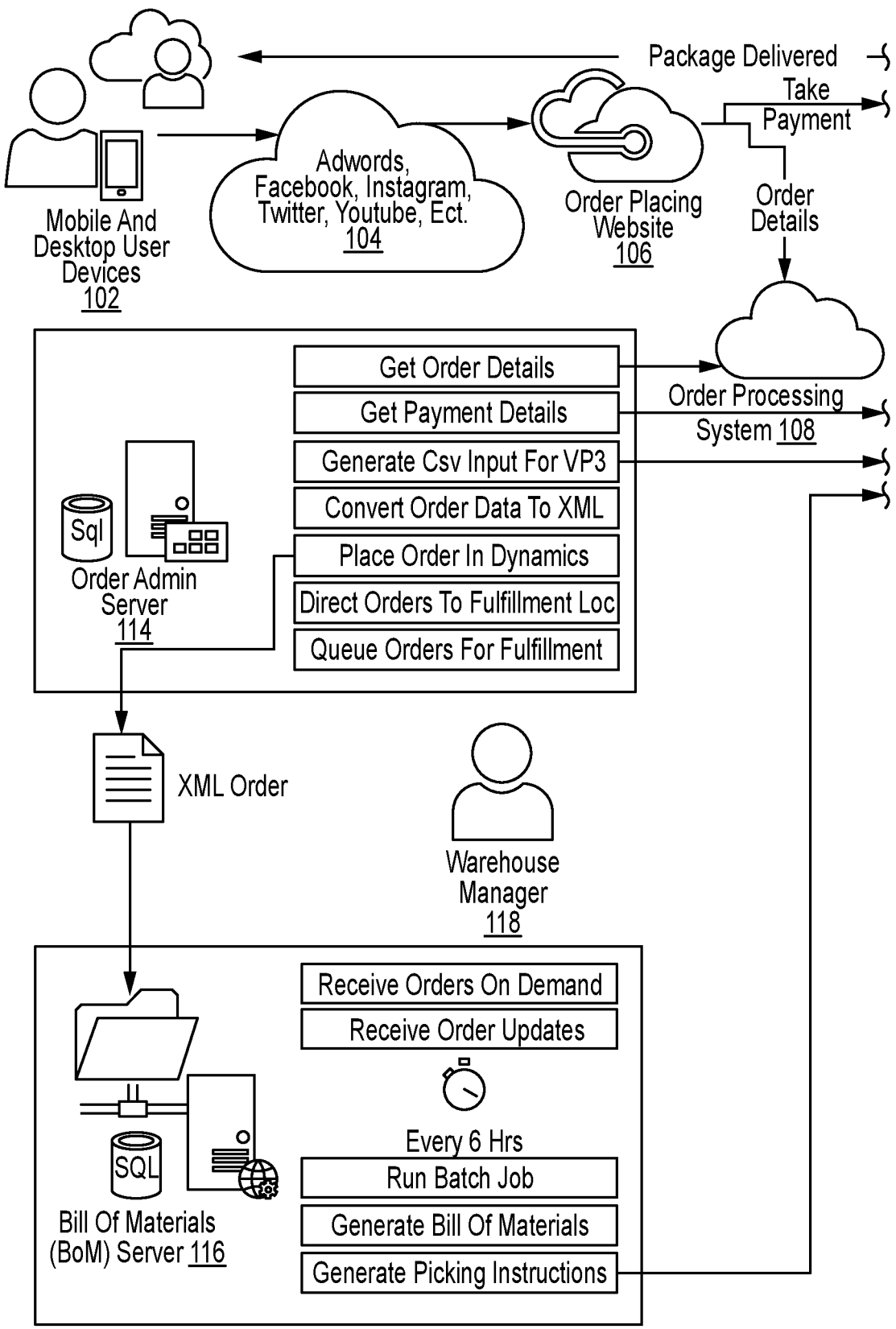
FIG. 1 is a process flow diagram for assembling a variety pack according to one embodiment of the present invention.
Figure 1:
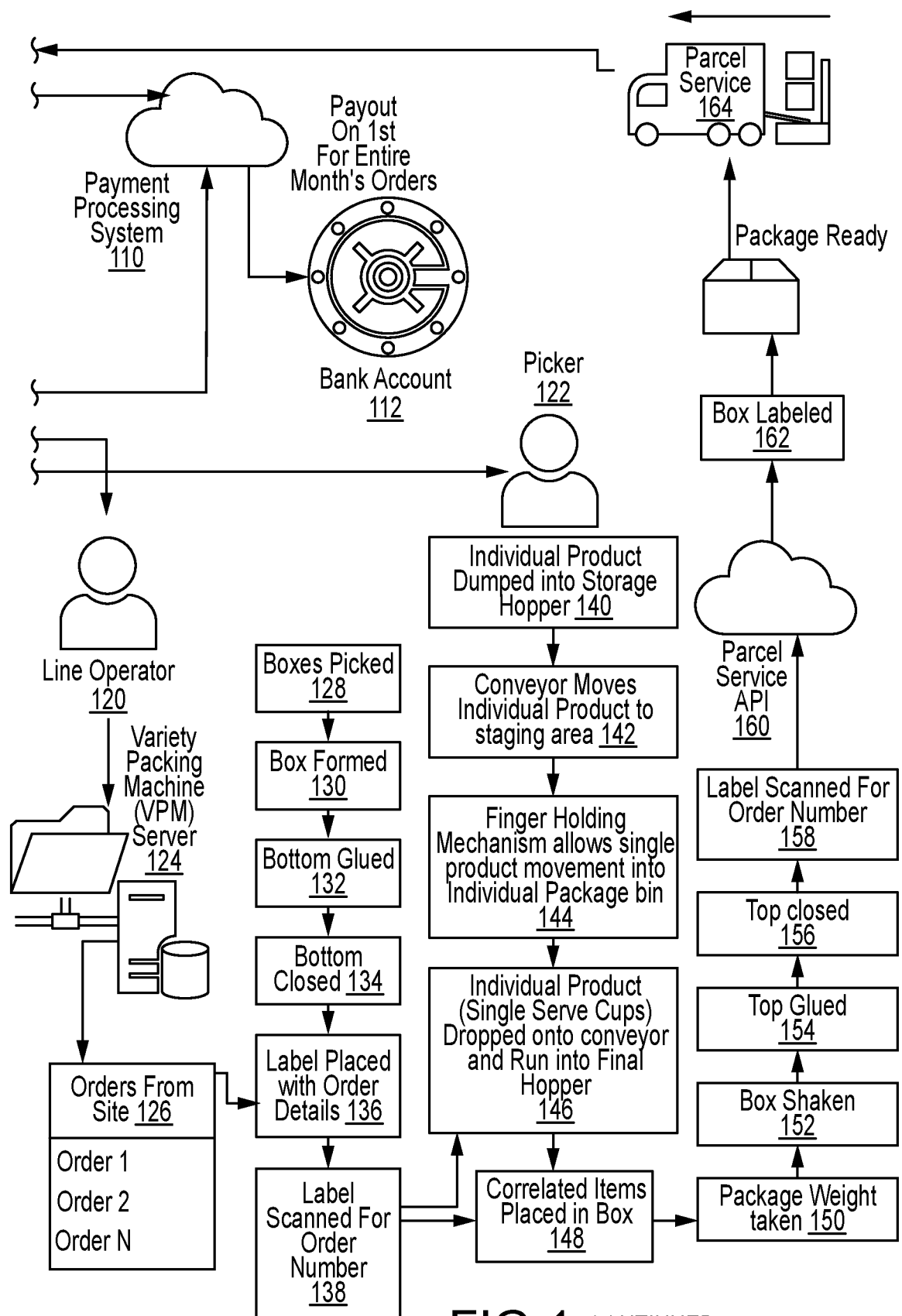

Described herein are methods, systems, apparatuses, graphical user interfaces, methods of manufacture, and computer readable media for allowing a consumer to select from multiple flavors and customize their own variety pack of single serve coffee pods and assembling those variety packs. However, the methods, systems, apparatuses, graphical user interfaces, methods of manufacture, and computer readable media described herein may be utilized to allow consumers to place any sort of customizable order and assemble it.

While this invention is susceptible of embodiment in many different forms, there is shown in the drawings and will be described in detail herein, several specific embodiments, with the understanding that the present disclosure is to be considered as an exemplification of the principles of the invention and is not intended to limit the invention to the embodiments illustrated. Although specific embodiments have been described herein relating to single serve coffee pods, the scope of coverage of this disclosure is not limited thereto and nothing herein should be construed to limit this disclosure only to custom orders of single serve coffee pods as will be appreciated by those skilled in the art.

FIG. 1 shows an example process flow for placing and filling an order for a custom variety pack of single serve coffee pods. Consumers may place orders on an order placing website 106 which is accessed using their mobile and desktop user devices 102. A consumer may navigate to the order placing website 106 with their mobile and desktop user devices 102 by entering a universal resource locator (URL) into an internet browser or may select a link that navigates them to the website. In some examples, the user may be directed to the order placing website 106 through an advertisement 104 such as through AdWords, Facebook, Instagram, Twitter, YouTube, other platforms, and/or services that offer advertisements. The consumer may also be redirected from a retailer's website to the order placing website which may be "white labeled" such that a retailer's branding may be presented to the consumer. The customized orders are entered through a graphical user interface (GUI), such as one or more of those shown in FIGS. 11-15 and described herein.

Custom orders placed at the mobile and desktop user devices 102 by the consumers may include an indication of a box size (e.g., total number of coffee pods per box) and how many of each of selected varieties of product (e.g., coffee pods) the user would like included in their customized box. These order details captured by the order placing website are processed through an order processing system 108 such as, for example, shipstation.com. The order processing system 108 receives the custom order from the mobile and desktop user devices 102, and in turn, the order placing website 106. The mobile and desktop user devices 102 may be, in various embodiments, electronic devices such as a laptop, tablet, mobile phone, smart watch, desktop computer, or any other type of electronic device that may access the internet and submit an order. The order processing system 108 may store and/or aggregate orders from many various mobile and desktop user devices 102 and/or multiple order placing websites.

A payment processing system 110 is used to process payment from mobile and desktop users 102 associated with their custom orders. For example, stripe.com may be used as the payment processing system 110 to process and receive payments for custom orders. The payment is typically deposited into a bank account 112. Payments are typically deposited as they are received or may be deposited in aggregate, for example at the beginning or end of each month.

An order administration (admin) server 114 receives order details from the order processing system 108, either on demand, at certain scheduled intervals, and/or at the time when the orders are placed. The order admin server 114 may also communicate with the payment processing system 110 to verify payment details and confirm that the payment has been properly received for each of the custom orders. The order admin server 114 generates a list of orders for transmission to a line operator 120 or a line operator device such as a laptop, mobile, desktop, or other electronic device. The line operator 120, using their electronic device may send the list of orders to a variety packing machine (VPM) server 124, shown in FIG. 1 as orders from site 126. In some embodiments, the list of orders may be transmitted directly from the order admin server 114 to the VPM server 124. In some embodiments, the order admin server 114 and the VPM server 124 may be the same server. In various embodiments, the processes described herein may be performed individually by any of the servers or other computing devices described herein or the processes may be performed by any combination of the servers or other computing devices described herein. The processes described herein may also be performed by other types of systems, such as cloud computing systems, systems with applications that run on hosted virtual machines, and/or systems with containerized applications.

The various servers described herein may include one or more processors operably coupled to a memory or storage device such that the one or more processors may read, write, delete, etc. information from or to that memory. Similarly, the servers may include computer readable media on which instructions are stored to implement any of the processes described herein. The instructions stored on the computer readable media of the various servers described herein may be executed by the one or more processors.

The list of orders may be, for example, a comma-separated value (CSV) electronic file. The list of orders may include, for each order from a consumer, a variety pack size (e.g., how many total single serve coffee pods the consumer has ordered for inclusion in a variety pack) and the number of each individual variety of product the consumer ordered (e.g., how many decaf, dark roast, medium roast, etc. single serve coffee pods the consumer wants in their variety ordered). The order admin server 114 may also convert the order data (e.g., list of orders) into a spreadsheet (e.g., WL) format so that the data may be sorted, manipulated, or otherwise used as described herein. For example, the xML order data may be sent to a warehouse manager 118 device, such as a bill of materials (BoM) server 116. The BoM server may be, for example, a Microsoft Dynamics 2012 R3 server. In some embodiments, the admin server and the BoM server 116 may be the same server or electronic device.

In some embodiments, the order admin server 114 may perform other functions, such as directing orders to specific fulfillment locations. For example, orders may be directed to particular fulfillment locations where the variety packs will be assembled based on the location to which the orders will ultimately be shipped. Orders may also be directed based on the type of contents the consumer selects for their variety pack. For example, certain fulfillment locations may have inventory that does not match an order, so variety packs that select a certain designated product are sent to a fulfillment location that has that product available. Orders may also be sent to particular fulfillment locations to balance workloads of individual fulfillment centers. Orders may also be sent to particular fulfillment locations based on delays and/or equipment at particular fulfillment centers being broken, repaired, and/or otherwise offline or running at less than full capacity.

The order admin server 114 may also queue orders for fulfillment. For example, orders may be sorted for processing in a specific sequence for various reasons, such as to increase the efficiency of a fulfillment location, shipping custom orders to consumers faster, and/or more efficiently utilize inventory. For example, orders may be queued based upon when they were placed by customers to reduce the amount of time it takes to fill any individual consumer's order. In another example, orders may be queued to maximize the efficiency of a fulfillment location and/or individual machine within a fulfillment location that assembles variety packs. For example, if a machine that fills orders may pack a maximum of 8 varieties (e.g., of single serve coffee pods), multiple machines may be used to allow consumers to select more than 8 possible varieties. In such an example, the orders that may be filled by each machine may be queued together. In another example, a single machine may be used to fill orders using more than 8 varieties. In such an example, if the machine may only fill packs with 8 varieties at one time, the varieties may have to be changed out to accommodate orders that use different sets of 8 varieties. Accordingly, the orders may be queued to minimize switching between variety sets for a given fulfillment machine.

In another example, orders may be queued based on available inventory. If a fulfillment location has inventory of certain varieties in stock and does not have other varieties, the orders that only include varieties in stock may be queued up together and filled first to allow more time for the out of stock varieties to arrive. In another example, the orders may be queued according to characteristics of inventory at a fulfillment location (or multiple fulfillment locations).

Orders may additionally be queued and sent to fulfillment centers based upon the expiration date of the product being packaged. For example, it may be desirable to package product having an earlier expiration date before using product with a later expiration date so as to give the consumer product having the longest possible shelf life. In another example, the orders may be queued to maximize the efficiency of a picker 122 that loads individual varieties into a machine that packs the variety packs. In such an example, the orders may be queued up so that a picker can keep up with loading varieties into a packing machine and prevent the machine from ever running out of a particular variety. Regardless of how the orders are queued, the queuing may be used as a factor for determining the picking instructions that are generated and sent to an electronic device of the picker 122 so that the proper varieties may be picked and loaded into the machine.

After the orders (either queued or otherwise organized) are sent to the BoM server 116, the bill of materials (varieties needed and quantities of those varieties needed) and the picking instructions to fill orders may be generated and sent to a device of the picker 122. The BoM server 116 may also run a batch job or otherwise receive updates on new custom orders coming in at regular intervals, for example every 6 hours. The BoM server 116 may use the updates to update and/or generate new bills of materials and picking instructions for the picker 122.

At the fulfillment location, packaging for receiving the variety pack product may be formed. For example, boxes may be used. The boxes may be picked 128, formed 130, glued 132, and the bottom of the box is closed 134. These boxes will be used for receiving the individual products for a variety pack. These boxes may be formed, glued, and/or closed by a box former, such as a box former 252 shown in FIG. 2F.

Once the boxes are formed and ready to receive the variety pack product (elements 128, 130, 132, and 134), a label for each box is created using the orders queued and sent to the VPM server 124. For example, the queued orders may be queued orders from a website 126 (e.g., Order 1, Order 2 . . . Order N) such as the order placing website 106 and processed and queued as described herein. A label is generated for each customized order and placed on a formed box 136. The label includes order details, and a scannable element and/or machine-readable code that indicates varieties that are to be placed in the labeled box. In some embodiments, the label may merely include a unique order number which may be used by a variety packing machine to retrieve the details of that order from a server. In some embodiments, the information included on the label may include the order details that the variety packing machine utilizes to fill an order without seeking information from a server. For example, the scannable element and/or machine-readable code may have encoded therein information about the specific order details of the variety pack. In this way, a scanner, for example, may scan the label and use the information determined from the label to pack the variety pack. In some embodiments, a variety packing machine may get the information utilized to fill an order from a combination of information encoded on the label and from the one or more servers. The labels may be printed and placed on the boxes by a labeler, such as a labeler 402 shown in FIG. 3.

A labeled box may then move along a conveyor to a variety packing machine where the label is scanned for an order number 138. In this example, the order number allows the variety packing machine to look up the details of the order so that the variety pack may be assembled (e.g., fill a box with customized numbers of single serve coffee pods). The label may be scanned by a scanner, such as a scanner 502 shown in FIG. 4. The individual product correlated with a custom variety pack order may then placed in the boxes 148. An example of this process is described in more detail below with respect to FIGS. 2A to 2E.

Figure 2A:
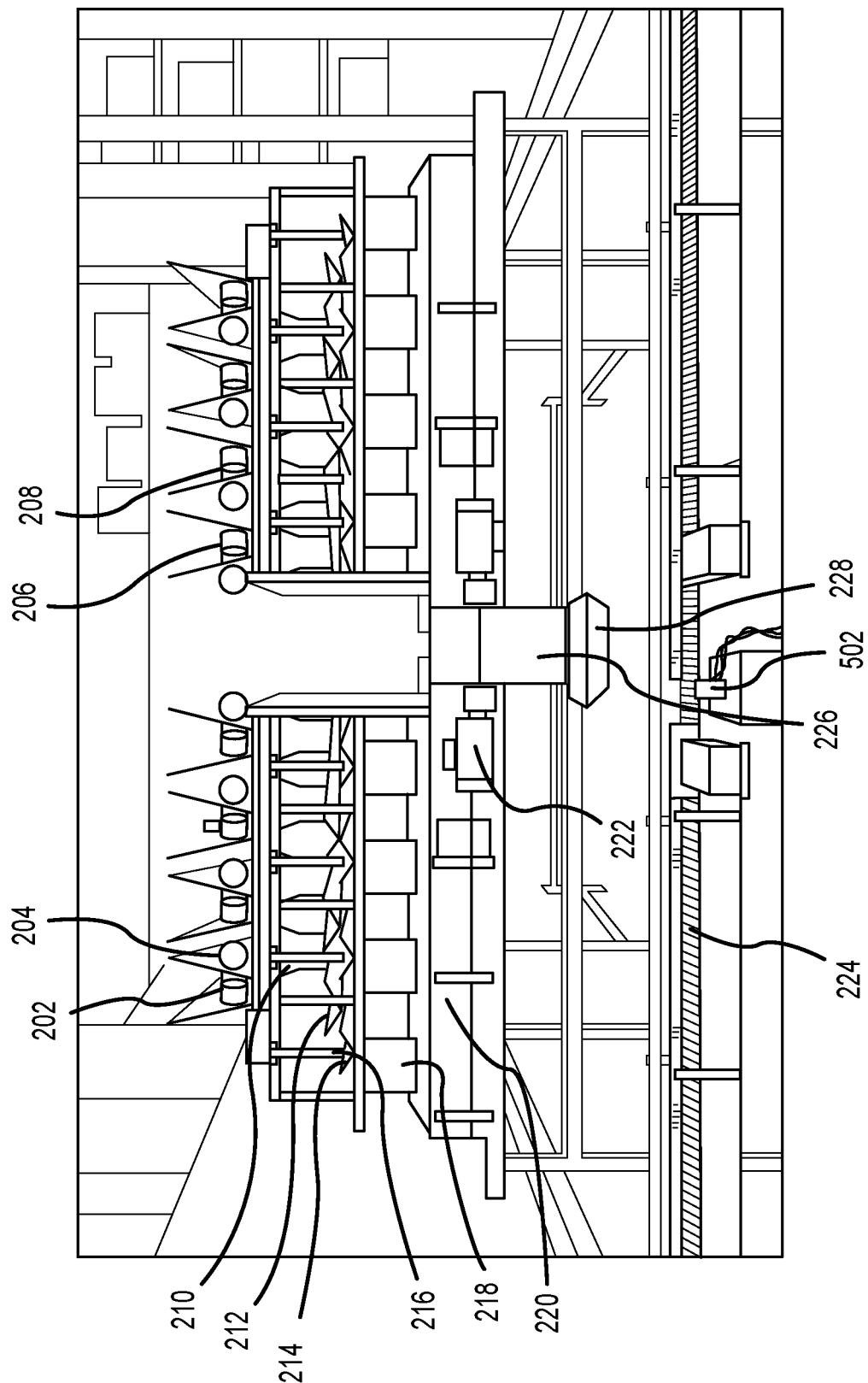
FIGS. 2A-2E are a front perspective view of a variety packing machine in various states according to one embodiment of the present invention.

The individual product is placed in the variety packing machine by a picker 122. The picker 122 may be a human or an automated machine, or a combination thereof. The picker 122 supplies individual product to a storage hopper 140. Each variety may have its own storage hopper in which the product is placed. An example of storage hoppers 254(*a*)-(*d*) is shown in FIG. 2F. A conveyer then moves the product into a staging area 142. Example conveyers 202 and 206 are shown in FIG. 2A, and an example conveyer 256 is shown in FIG. 2F.

A finger holding mechanism allows single product movement from the staging area into individual package bins 144. This enhances the variety packing machine's ability to get accurate cup counts to match custom orders from consumers. Examples of the finger holding mechanisms are shown as fingers 216, 238, and 242 in FIGS. 2A and 2B and are described in greater length below. Once the individual cup counts in each of the individual package bins matches a custom order, the individual products are dropped onto a conveyer and deposited into a final hopper 146, which drops the products correlated with an order into the appropriate box 148.

The box with product in it is then weighed 150. The weight of a single variety of each type of product is known, as well as the weight of a formed box with the bottom glued shut such that weighing the box provides a quality check to ensure that the box has been filled with the correct contents for the custom order. The weight may also be used to verify a shipping charge for the box. If the box is not the expected weight, it may be rejected as non-conforming to a custom order, and the box may be checked or re-packaged to accurately fill the customer's order. The box may be weighed by a scale, such as a scale 602 in FIG. 5. A rejected box (e.g., one that is determined to not have accurately filled with the various products corresponding to the consumer's order for a customized variety pack) may be ejected from a conveyer line by an actuator, such as an actuator 704 in FIG. 6.

The box is then shaken 152 to ensure that the individual products (e.g., coffee pods) settle into the box so that the box may be closed and sealed. The box may be shaken by a shaker, such as a shaker 804 in FIG. 7. The top of the box is then glued 154 and closed 156. The box may be closed by a box closer, such as a box closer 902 in FIG. 7.

Figure 8:
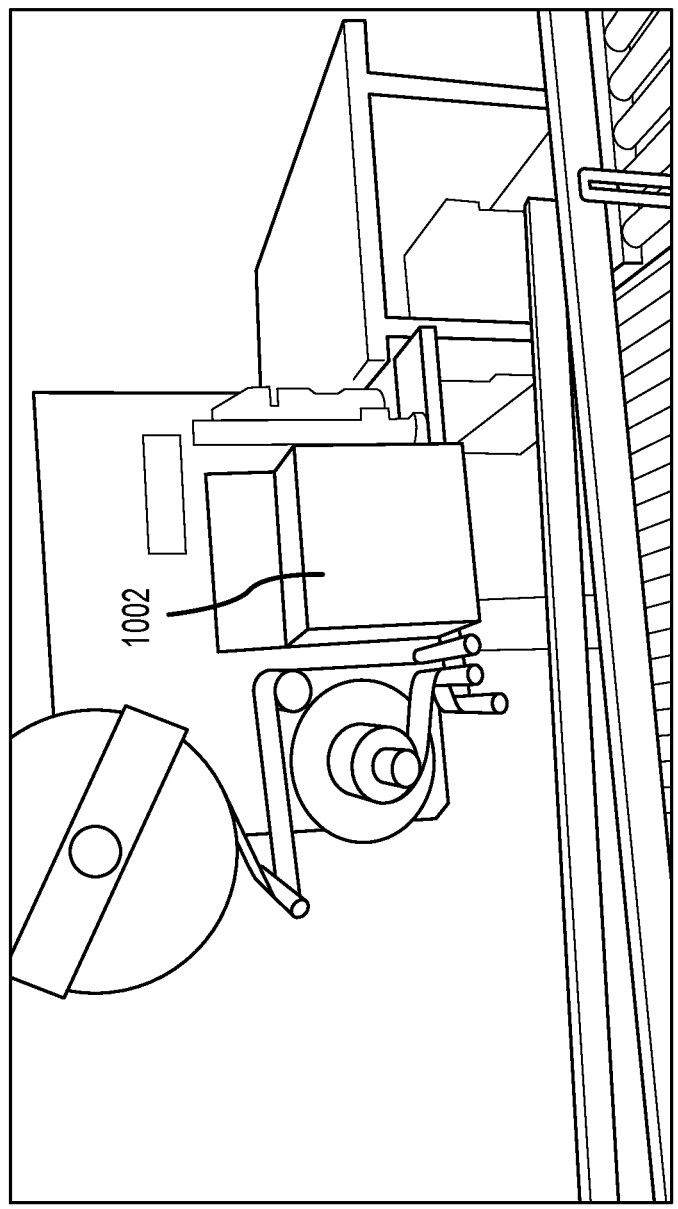
FIG. 8 is a perspective view of a labeler according to one embodiment of the present invention.

The label originally placed on the box before it was filled with product is then scanned again 158 to identify the order. This order number may be used to determine order details, including shipping details. Those order details and/or order number may be used with a parcel service API 160 to determine additional shipping details and/or a shipping label for the box. The shipping label is printed and placed on the box 162. The label may be placed on the box by a labeler, such as a labeler 1002 in FIG. 8. The package is then sent to a delivery service 164 for shipment to the consumer who placed the order (or to wherever the consumer directed the order to be shipped when the order was placed). In various embodiments, instead of determining shipping details after the box is filled with product and closed, the shipping details may be determined before filling the box with product (e.g., at the same time the original label is determined and placed on the box). In such embodiments, shipping information necessary to ship the box may be included on the original label. In some embodiments, even if the shipping information is determined at the same time as the information for the original label, a separate shipping label may be affixed to the box at any time during the process (e.g., at the same time as the original label, before or after the product is put in the box, before or after the box is closed, etc.).

FIG. 2A shows an embodiment of a variety packing machine. The variety packing machine in FIG. 2A may be used in a process such as the process shown in FIG. 1 to fill custom orders. In particular, the variety packing machine in FIG. 2A packs boxes of single serve coffee pods that are specified by a consumer when placing their order for variety packs of single serve coffee pods online.

The variety packing machine includes conveyers that move individual varieties of coffee pods into a staging area. In FIG. 2A a first conveyer 202 is shown. The first conveyer 202 is moved by a first motor 204 that drives the first conveyer 202. The first conveyer 202 moves a first variety of coffee pods to a first staging area, which includes a first hopper 210. Three other conveyers and motors (not numbered) shown to the right of the first conveyer 202 and the first motor 204 move three other coffee pod varieties to staging areas similar to the staging area of the first conveyer 202. Similarly, a fifth conveyer 206 and a sixth conveyer 208 move a fifth and sixth variety of coffee pods to staging areas. A seventh and eighth conveyers (not numbered) are shown to the right of the sixth conveyer 208 to provide coffee pods of two more varieties. Thus, the machine in FIG. 2A may move eight varieties of coffee pods to respective staging areas to be packed into custom variety packs ordered by consumers. The first variety of coffee pods moved by the first conveyer 202 and subsequent movement and processing of the first variety of coffee pods is described below, but is typical of each of the other seven varieties of coffee pods that may be packed by the machine in FIG. 2A.

After being carried by the conveyer 202, the coffee pods pass into a hopper 210. The hopper 210 has an opening at the bottom that allows the coffee pods to pass into a first vibrating channel 212. The hopper 210 also has a swinging sidewall near the base of the hopper 210 nearest the first vibrating channel 212 (i.e., facing toward the perspective of the photo in FIG. 2A). The swinging sidewall is hinged so that it may swing to allow coffee pods to pass by as they vibrate to the front of first vibrating channel 212. The swinging sidewall helps prevent excessive stacking of the coffee pods upon one another by knocking them off of one another as the first vibrating channel 212 vibrates. The vibrating of the vibrating channel 212 also helps separate the coffee pods and keep them from stacking on one another vertically. As described herein, this enhances the ability to get a more accurate count of individual cups for placing into product bins and to increase accuracy of the variety pack (to make sure the variety pack matches the order).

The coffee pods vibrating in the first vibrating channel 212 move to the front of the first vibrating channel 212 on account of the shape and orientation of the first vibrating channel 212. The first vibrating channel 212 is v-shaped and is angled downward slightly away from the hopper 210 so that the coffee pods move away from the hopper 210 as the first vibrating channel 212 vibrates toward a second vibrating channel 214. Once the coffee pods vibrate to the front of the first vibrating channel 212, they fall into the second vibrating channel 214. Similar to the first vibrating channel 212, the coffee pods incrementally move to the front of the second vibrating channel 214 due to vibration of the channel, the v-shape of the channel, and a slight downward angle of the channel (e.g., the second vibrating channel is angled downward slightly away from the first vibrating channel 212). The vibration of the two channels, causing the coffee pods to fall between channels, and the swinging sidewall of the hopper 210 all help separate the coffee pods from stacking, and help cause the coffee pods to be in single file by the time they reach the front of the second vibrating channel 214 (e.g., the portion of the second vibrating channel 214 furthest from the hopper 210 and the first vibrating channel 210).

At the front of the second vibrating channel 214 is a "finger" 216. The finger 216 is attached to a structure of the machine by a hinge at the top of the finger 216, and hangs into a space of the v-shape at the front of the second vibrating channel 214. In various embodiments, the finger 216 may be attached rigidly or semi-rigidly to the structure of the variety packing machine rather than by a hinge. This arrangement of finger 216 prevents more than one coffee pod from falling into a hopper 218 at a time when the second vibrating channel 214 is vibrating. Instead, as the second vibrating channel 214 vibrates, the coffee pods in the channel press up against the finger 216 until enough force is generated on a coffee pod nearest to the finger 216 (from coffee pods behind the pod nearest the finger 216 pushing forward) to deflect the finger 216 so that the coffee pod at the front of the second vibrating channel 214 may pass by the finger 216 and fall into the hopper 218. The finger 216 may be made of any suitable material that may deflect in this manner, such as metal (e.g., aluminum) or plastic.

The hopper 218 has a door on the bottom that may be mechanically actuated. When the coffee pod initially falls into the hopper 218, the door is in a closed position so that the coffee pod remains in the hopper 218. The second vibrating channel 214 may continue vibrating until the desired number of coffee pods of a first variety have fallen into the hopper 218 past the finger 216. That is, it vibrates until the total number of coffee pods of that one variety as ordered by a consumer for a variety pack are in deposited in hopper 218. The packing machine may verify that the correct number of coffee pods match the order have fallen into the hopper 218 by weighing the hopper 218 using the known weight of the coffee pod. In various embodiments, other methods of determining how many coffee pods have moved past the finger 216 may be used. For example, a sensor that senses movement of the finger 216 may be used to determine each time a coffee pod moves from the second vibrating channel 214 past the finger 216. Regardless of how the coffee pods are counted, the second vibrating channel 214 may be vibrated until the correct number of coffee pods fall into the hopper 218 (i.e., until the weight of the hopper 218 matches an order) or otherwise move past the finger 216. In some embodiments, other processes and/or sensors may be used to determine how many coffee pods are in or have fallen into the hopper 218. In embodiments where the number of coffee pods that move past the finger 216 may be determined before they fall in to the hopper 218 (e.g., using a sensor to track movement of the finger, using a motion sensor to identify when a coffee pod falls from the second vibrating channel 214, etc.), the variety packing machine may not include a hopper 218 or the other hoppers associated with each variety, because the number of coffee pod varieties may be determined without weighing the coffee pods in the hopper 218 and similar hoppers.

Once the system determines that the correct number of coffee pods are in the hopper 218, the door on the bottom of the hopper 218 opens to allow the coffee pods to fall onto a conveyor 220 driven by a motor 222. Once coffee pods have dropped onto the conveyer 220, the conveyer 220 moves the coffee pods to a final hopper 226. The final hopper 226 includes a door 228 at its bottom. Opening door 228 controls when the coffee pods in the hopper 226 are dropped into a box. Formed boxes are moved into position under the hopper 226 by a conveyer 224. Before a box is in position under the hopper 226, scanner 502 reads a label on the box, which is used to instruct the packing machine how many coffee pods to load into the hopper 228 for packing in the box. The door 228 of the hopper 226 opens to allow coffee pods to fall into a box positioned under the hopper 226. In this manner, the packing machine of FIG. 2A permits a box to be filled with a customized number of coffee pods of up to eight varieties. Once a box is filled with coffee pods, it moves to the right to be weighed and closed as described herein.

Scanner 502 is positioned at a point along the conveyor 224 where a rail of the conveyor 224 is not blocking an optical path of the scanner 502. Scanner 502 may thus scan a label on a box that is about to be in position under the final hopper 226. Accordingly, the scanner 502 may scan the label toward retrieving details about the mix of products to be placed in the next variety pack box waiting to be filled. The information for the next variety pack may then be sent to the variety packing machine while the box currently under the final hopper 226 is being filled. In various embodiments, the scanner 502 may be positioned differently. For example, the scanner 502 may be positioned to scan the box currently under the final hopper 226, or may be positioned to scan another box further up in the queue that has not yet been filled. Whenever the scanner 502 is positioned to scan a box not under the final hopper 226 (e.g., such as shown in FIG. 2A), a queue for one or more variety packs may be ordered to more efficiently pack boxes. That is, the variety packing machine will not have to wait for variety pack details to be determined or for a box to move under the final hopper 226 to start the process of filling an order.

Figure 2B:
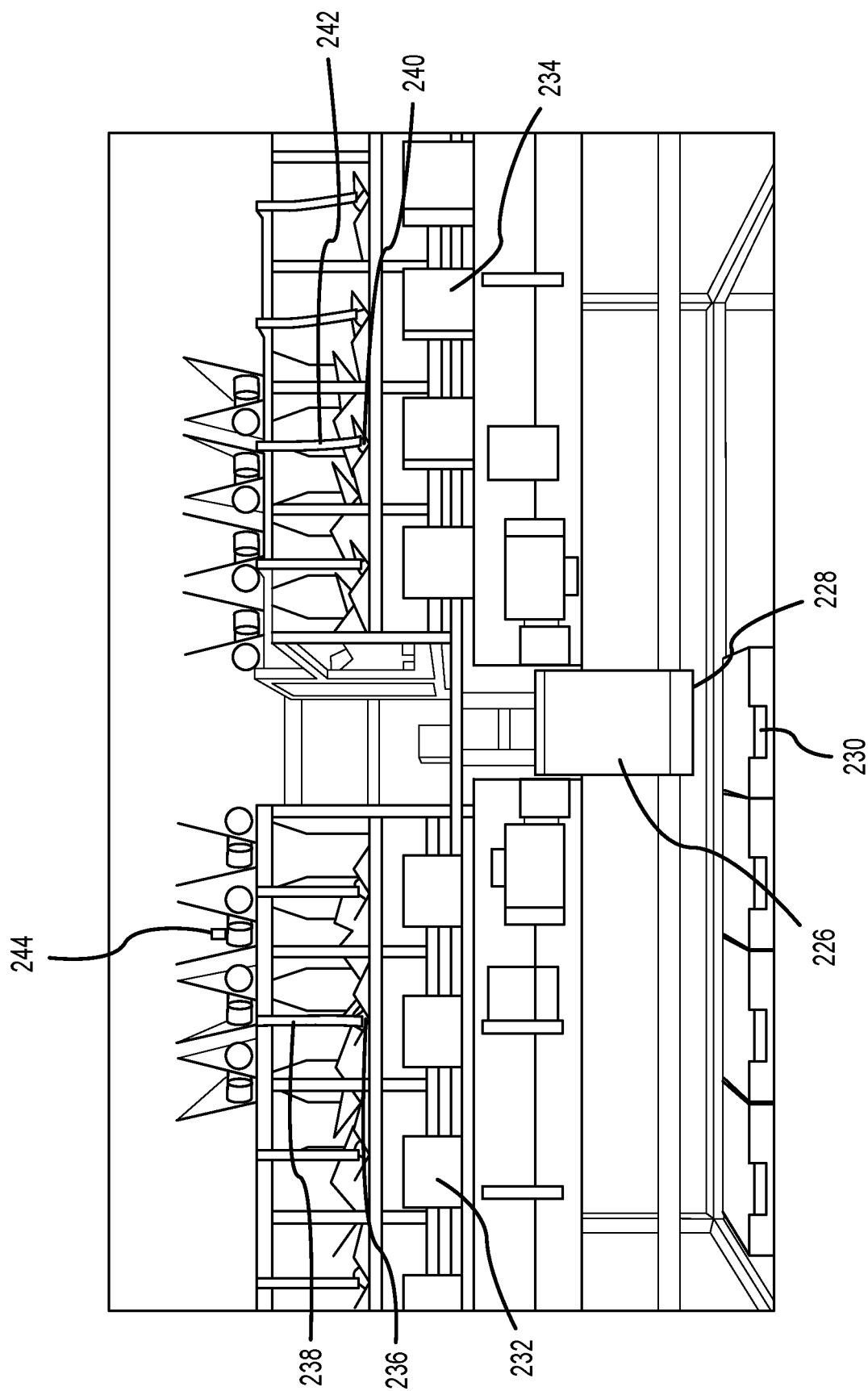

An embodiment of a sequence in which boxes may be filled with a customized variety of coffee pods is shown and further described with respect to FIGS. 2B to 2E. In FIG. 2B, a coffee pod 244 is shown at the top a conveyor just before falling into a first hopper. A second coffee pod 236 of the same variety as the coffee pod 244 is shown falling out of a second vibrating channel. The second coffee pod 236 has deflected the finger 238 as the second vibrating channel vibrates to allow the second coffee pod 236 to fall into a hopper. A third coffee pod 240 is shown being blocked from falling into a hopper by a finger 242 while a vibrating channel in which the third coffee pod 240 sits is not vibrating. Thus, fingers may keep coffee pods from falling into a hopper when the vibrating channels are not vibrating, allowing the machine to control the falling of coffee pods into hoppers by controlling whether and how much to vibrate certain vibrating channels associated with certain varieties.

The four hoppers on the left of FIG. 2B each have doors that control when certain varieties of cups fall onto a conveyer before being moved by the conveyer into the hopper 226. These doors are typified by a door 232 on one of the left hoppers. The four hoppers on the right of FIG. 2B have doors that are typified by a door 234. The final hopper 226 also has the door 228. In FIG. 2B, the doors 232, 234, and 228 are all closed. A box 230 is in position under the hopper 226 that has already been filled with a custom number of up to eight varieties of coffee pods. As discussed herein, a label indicating order information was scanned to instruct how many and what varieties to fill the box 230 with before the box 230 was moved into position under the hopper 226. A box to the left of the box 230 is scanned while the box 230 is being filled with cups so that the hoppers above may begin to be filled with cups for the next box while the box 230 is being filled. For example, in FIG. 2B, the four hoppers on the left side are already being filled with cups (e.g., the cup 236) for the next box after the box 230.

Figure 2C:
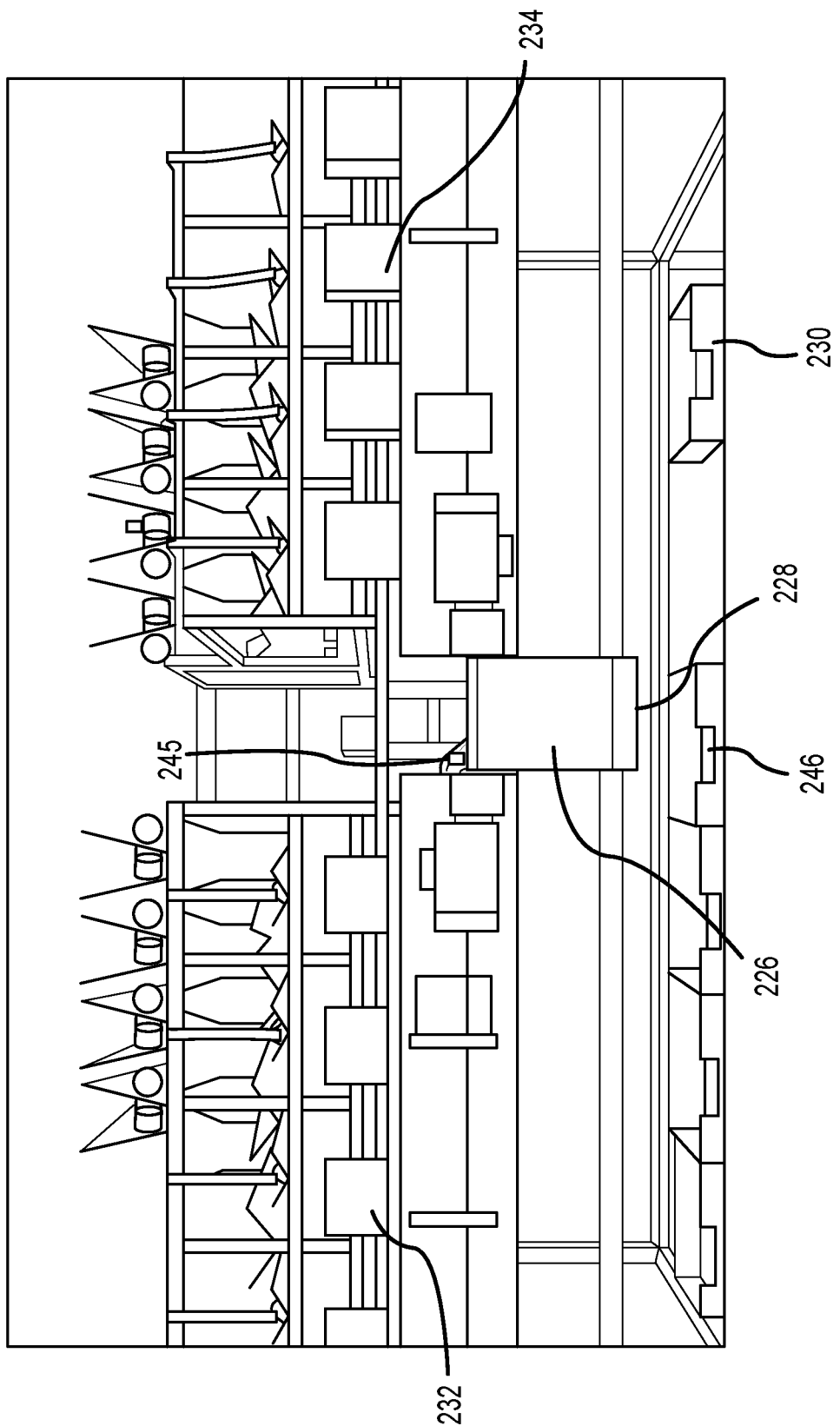

In FIG. 2C, the filled box 230 moves down a conveyor to be weighed, shaken, and sealed shut. A box 246 is being moved into position under the hopper 226 so that the box 246 may be scanned and filled with a custom order of coffee pods. As discussed above, a label of the box 246 has already been scanned so the variety packing machine may determine which coffee pods to deposit into the box. Door 232 (as well as the doors of the other left-handed hoppers) are opened allowing coffee pods 245 to fall into the hopper 226. These pods may be filled into the hopper 226 even before the box 246 is in position under the hopper 226 because the label on the box 246 was already scanned while the box 230 was under the hopper 226. The doors 228 and 234 are closed as the system counts out the number of cups needed from the varieties associated with the right handed hoppers. In addition, the door 228 stays closed until the system verifies that the box 246 is in position under the hopper 226 to be loaded with coffee pods.

Figure 2D:
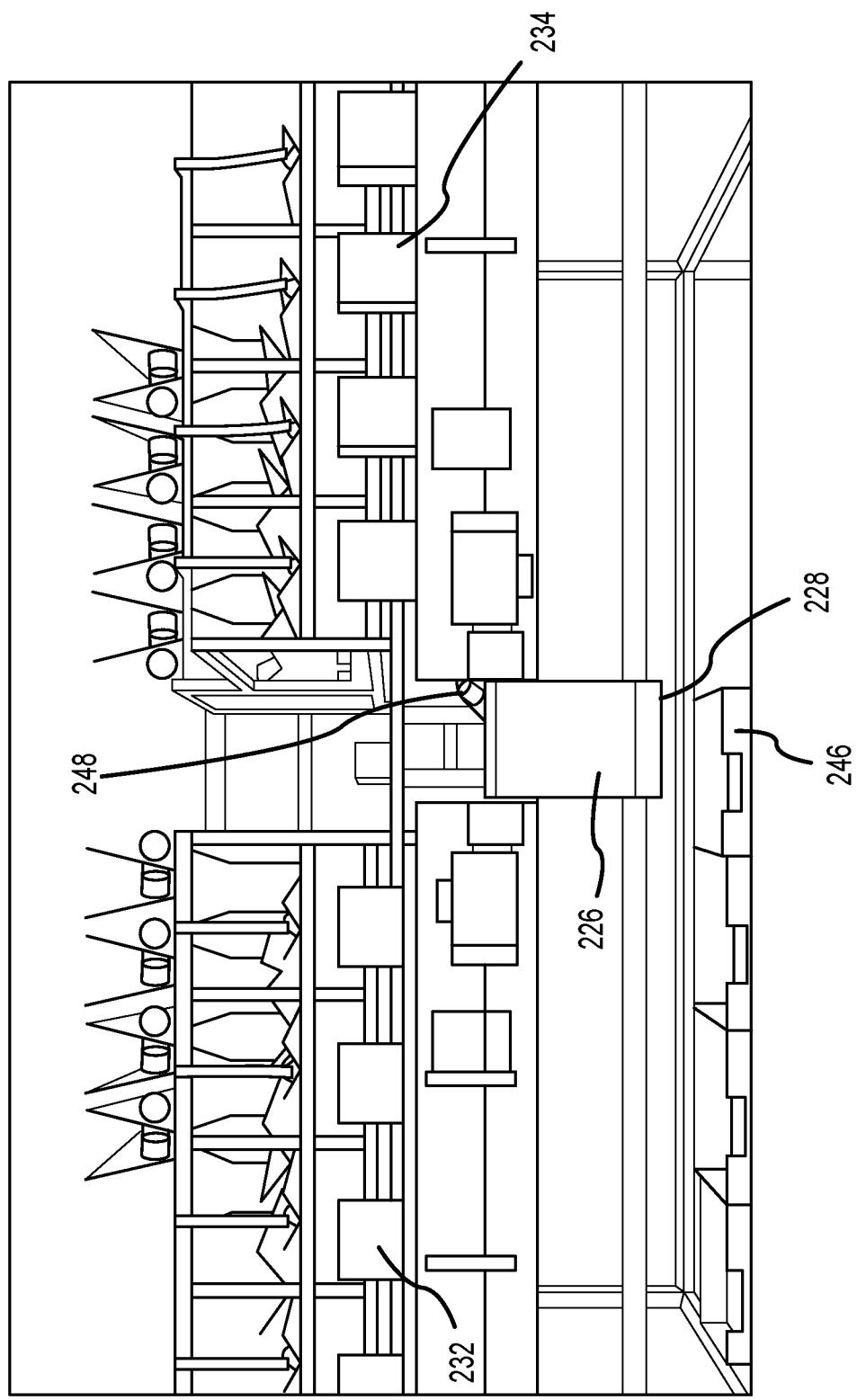

In FIG. 2D, the proper number of cups have been put into the right handed hoppers, so the doors including the door 234 are opened to allow cups 248 onto the conveyer and into the hopper 226. The doors on the left including the door 232 are now closed. At this time, cups for the box after the box 246 may begin to be counted out into hoppers on the left side because the next box after the box 246 has already been scanned.

Figure 2E:
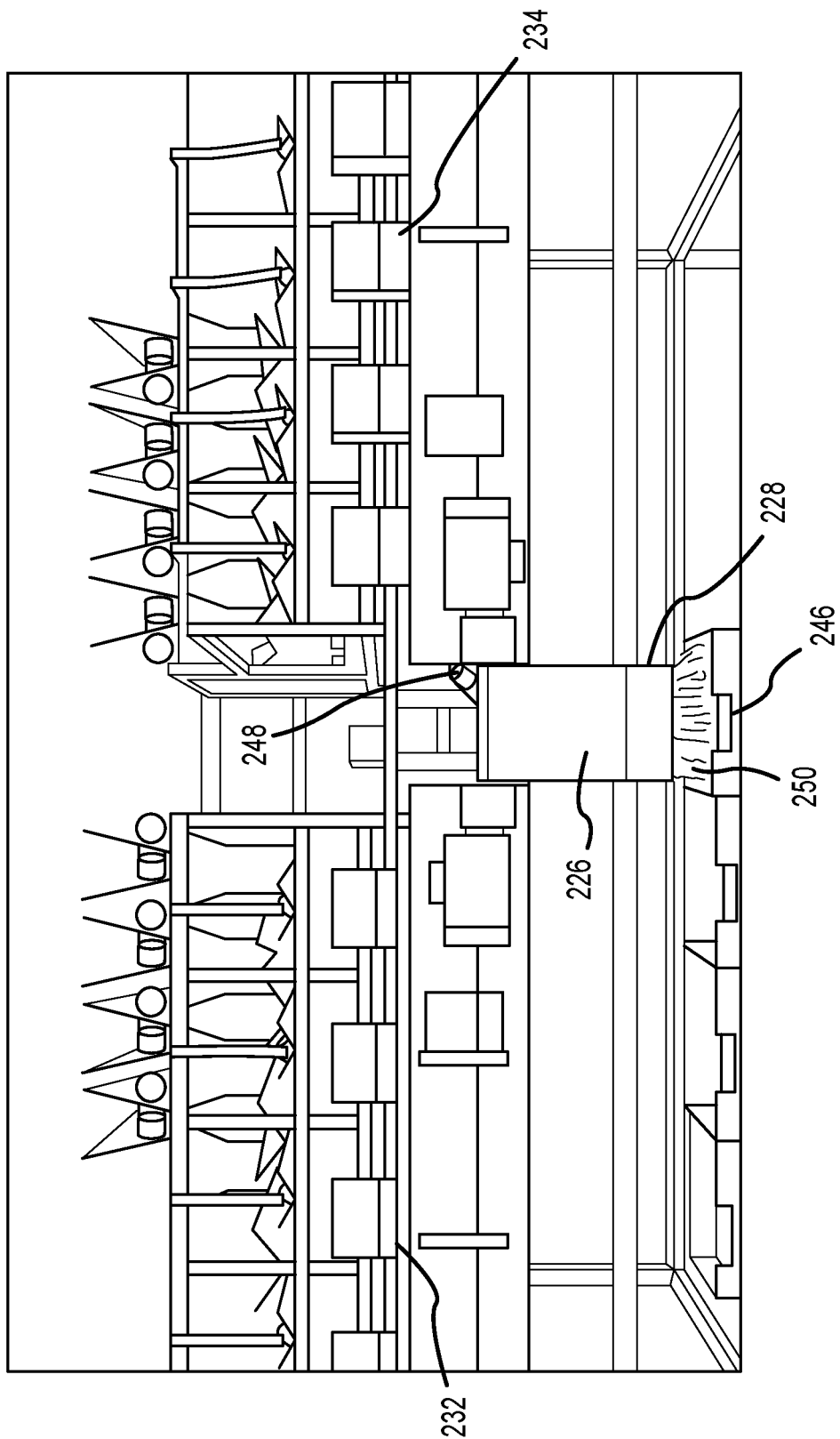
Figure 2F:
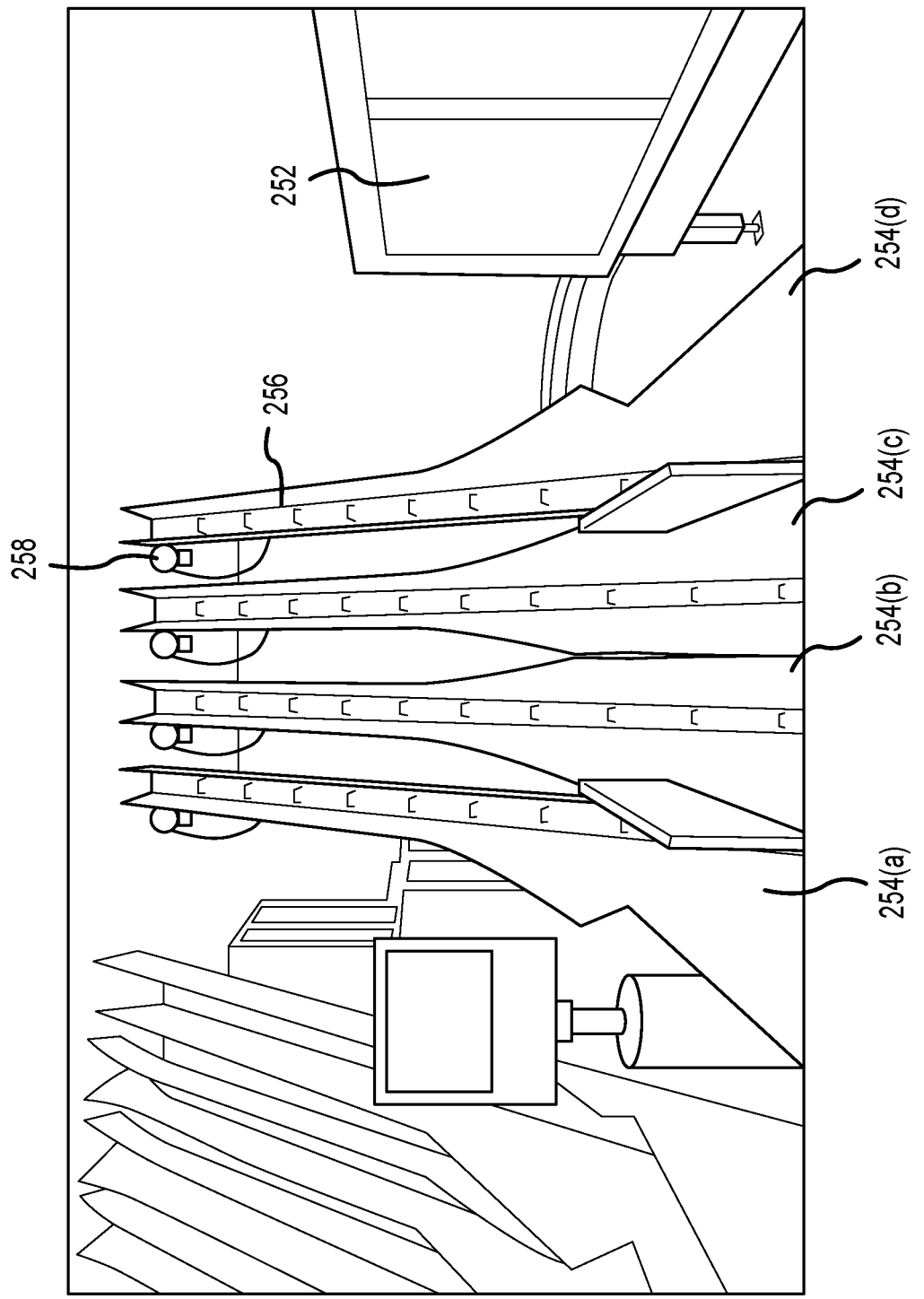
FIG. 2F is a rear perspective view of a variety packing machine according to one embodiment of the present invention.

In FIG. 2E, the door 228 is opened to allow cups 250 to fall into the box 246. The cups 250 include all the cups for the variety pack of up to eight varieties. The cups 248 from the right hand side hoppers may still be falling into the hopper 226 from the conveyer and directly into the box 246 to reduce the total time it takes to pack a box. While the box 246 is being filled, the doors 232 and 234 are closed. During this time, the system may begin vibrating the channels for some or all eight varieties to begin filling the hoppers of individual varieties of product for the next box after the box 246. This may occur because the box after the box 246 has already had its label scanned so the machine knows what varieties and how many of each variety should be put into the next box.

FIG. 2F illustrates a back view of part of the variety pack machine. This view illustrates four storage hoppers 254(a)-(d) in which a picker may dump varieties of coffee pods into. Four other storage hoppers (not pictured) for four more varieties are positioned to the left of the FIG. 2F. The coffee pods may then be transported from the storage hoppers into the first hopper of the packing machine (e.g., the hopper 210 of FIG. 2A) for packaging into a variety pack. For example, coffee pods deposited into the storage hopper 254(d) may be transported by conveyer 256 using a motor 258. The other storage hoppers have similar conveyers and drive motors. Also pictured in FIG. 2F is a box former 252 that forms boxes, which are then moved along a conveyer to the variety pack machine.

Figure 2G:
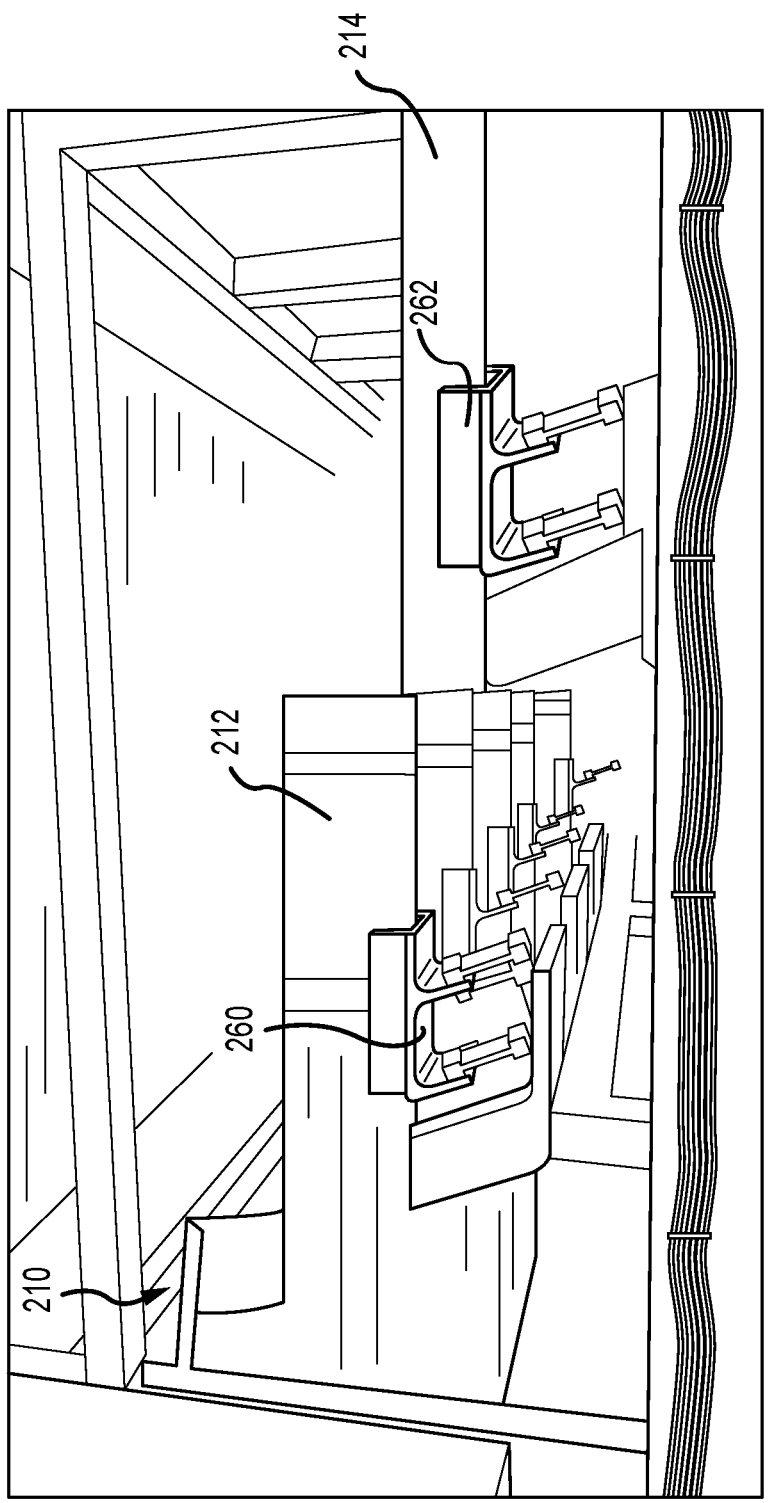
FIG. 2G is a side perspective view of a variety packing machine according to one embodiment of the present invention.

FIG. 2G shows a side view of the variety pack machine. The hopper 210 of FIG. 2A can be partially seen, where coffee pods initially fall from a conveyer at the top of the variety pack machine. Those coffee pods then fall into the first vibrating channel 212, which is vibrated by a vibrating mechanism 260. Coffee pods may then fall from the first vibrating channel into the second vibrating channel 214, which is vibrated by a vibrating mechanism 262. As discussed herein, the coffee pods are moved from the hopper 210, to the first vibrating channel 212, to the second vibrating channel 214, and then out of the second vibrating channel 214 past a mechanical finger due the vibration of the first and second vibrating channels 212 and 214. This vibration is imparted by vibrating mechanisms 260 and 262. By selectively vibrating the channels using the vibrating mechanisms 260 and 262, the number of coffee pods that move past a mechanical finger out of the second vibrating channel 214 may be controlled.

Although embodiments with respect to depositing single serve coffee pods into a box are described with respect to FIGS. 2A-2G, other adaptations, configurations and embodiments are possible. For example, various configurations of coffee pods and/or coffee capsules, and indeed other products may be selectable and deposited into a box pursuant to an end-consumer's order to form the customized variety pack according to the methods, systems, apparatuses, and computer readable media described herein.

Instead of single serve coffee pods, the individual products to be selected by a consumer to form a customized order may comprise packages that each contain multiple quantities of single serve coffee pods pre-packaged together in a box, bag or other container. These multi-packs may then be selected by a user through a GUI, and different numbers of multi-packs and different types of multipacks may be selected by a consumer to be included in a customized variety pack. Multi-packs may also include products other than single serve coffee pods. For example, multi-packs may include a plurality of identical or a variety of different roasts, origins, flavored or types of coffee, pre-packed single serve filter bags with ground coffee, or even coffee add-in products (e.g., creamer, flavor shots, sugar, sugar substitute, etc.), or identical or different flavors or type of coffee but packaged in pods or capsules for various brands of coffee makers, or any other type of product. Accordingly, an end-consumer may select different multi-packs to be included in a variety pack. For example, an end-consumer may be provided the ability to configure a twelve pack by select four different multi-packs where for example each pack contains three different single serve coffee products of each of the same of different flavor and/or region.

In various embodiments, the packing of a customized product may be done in multiple stages. For example, a consumer may customize the number and/or type of varieties they would like to be packaged in a first variety pack, which may serve as a multi-pack. For example, the first variety pack may be a multi-pack include consumer specified varieties of single serve coffee pods. A second variety pack may be a multi-pack that that includes consumer specified varieties of single serve espresso pods, for example. Both of those multi-packs may then be packaged together in a larger variety pack as described herein. Accordingly, an end-consumer variety pack may be highly customizable for an end-consumer, even when multi-packs are utilized.

Figure 3:
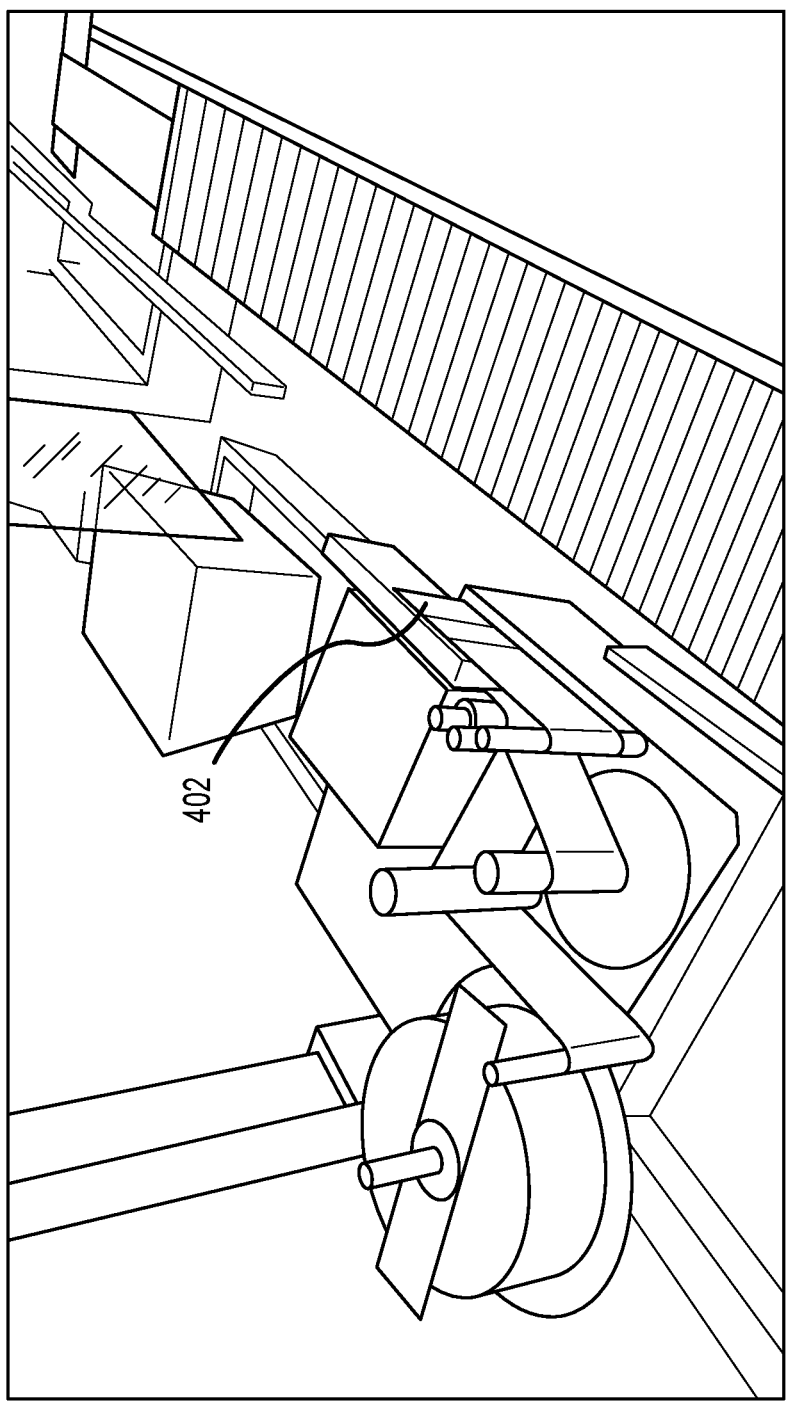
FIG. 3 is a perspective view of a labeler according to one embodiment of the present invention.

FIG. 3 shows a labeler 402 that puts a label on the boxes after they are formed and before they are filled with custom product. As described herein, the labels contain information regarding the custom order and the products that are to be placed into a box so the order can be properly filled. After the label is placed on a box, the box moves along a conveyer to the variety pack machine.

Figure 4:
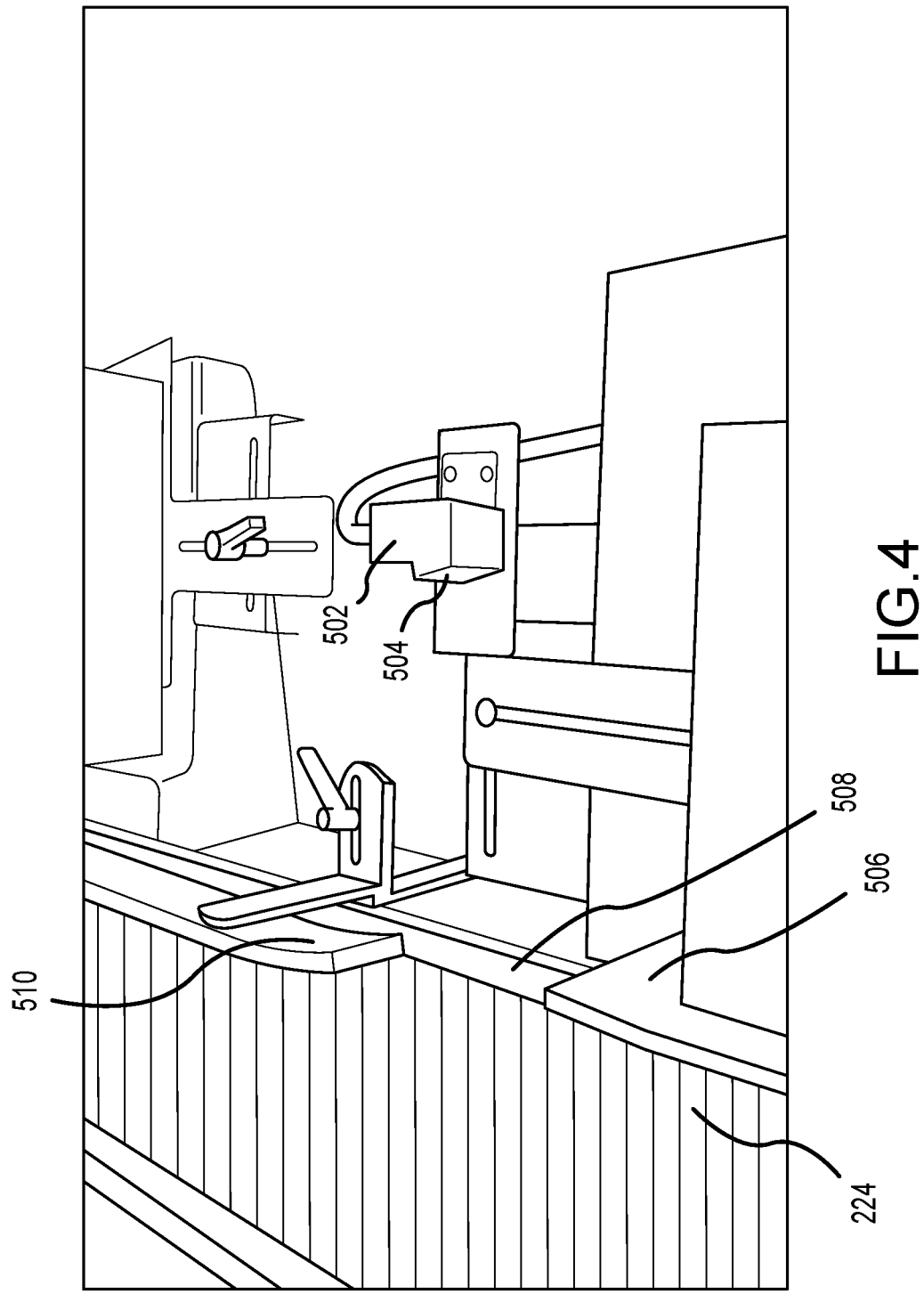
FIG. 4 is a perspective view of a scanner according to one embodiment of the present invention.

FIG. 4 illustrates a close up view of scanner 502 that scans the label on boxes before they are filled by the variety pack machines. A box moves on the conveyer 224. The scanner 502 includes optical scanning hardware 504 that scans a label on a box through an opening 508. The opening 508 is between a sidewall 506 and a sidewall 510. This opening allows a label placed toward to the bottom of the box to be scanned by the scanner 502 without being obstructed by the sidewalls 506 and 510. The sidewalls 506 and 510 are also angled away from the conveyer 224 near the opening 508 so that the edges of boxes that pass by the opening 508 are not caught by an edge of the sidewalls 506 and/or 510.

Figure 5:
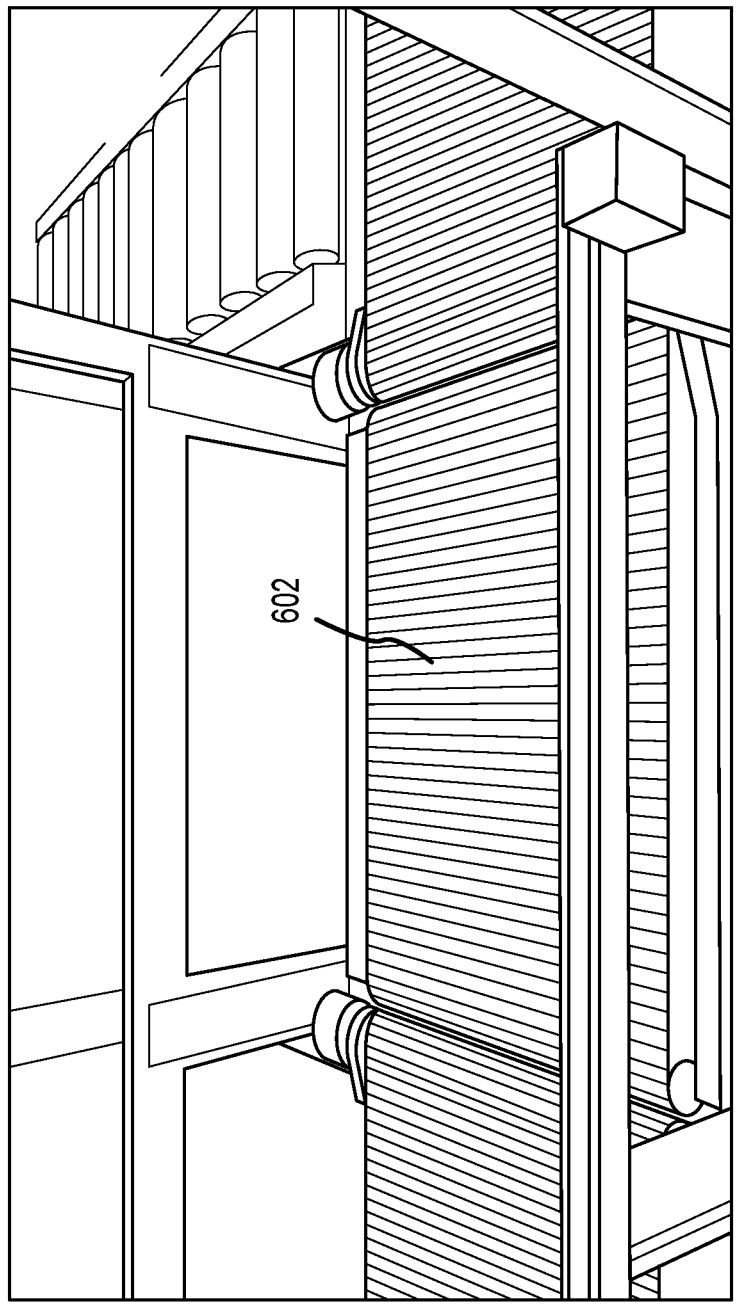
FIG. 5 is a perspective view of a scale according to one embodiment of the present invention.

FIG. 5 illustrates scale 602 integrated with a conveyer for weighing a box that has been filled with product. As discussed herein, the weight may be utilized to verify that the proper product has been placed inside the box according to the custom order. The box that is being weighed is scanned to determine details of the custom order to match to the weight. The scanning may be performed by the scanner 502, or may be performed by another scanner associated with the scale 602. The weighing of boxes of customized variety packs may occur after the boxes have been filled but before the boxes are closed and sealed. In this way, the boxes may be weighed for accuracy after filling, but if a problem is detected the boxes are not sealed closed so that the problem may be more easily addressed.

Figure 6:
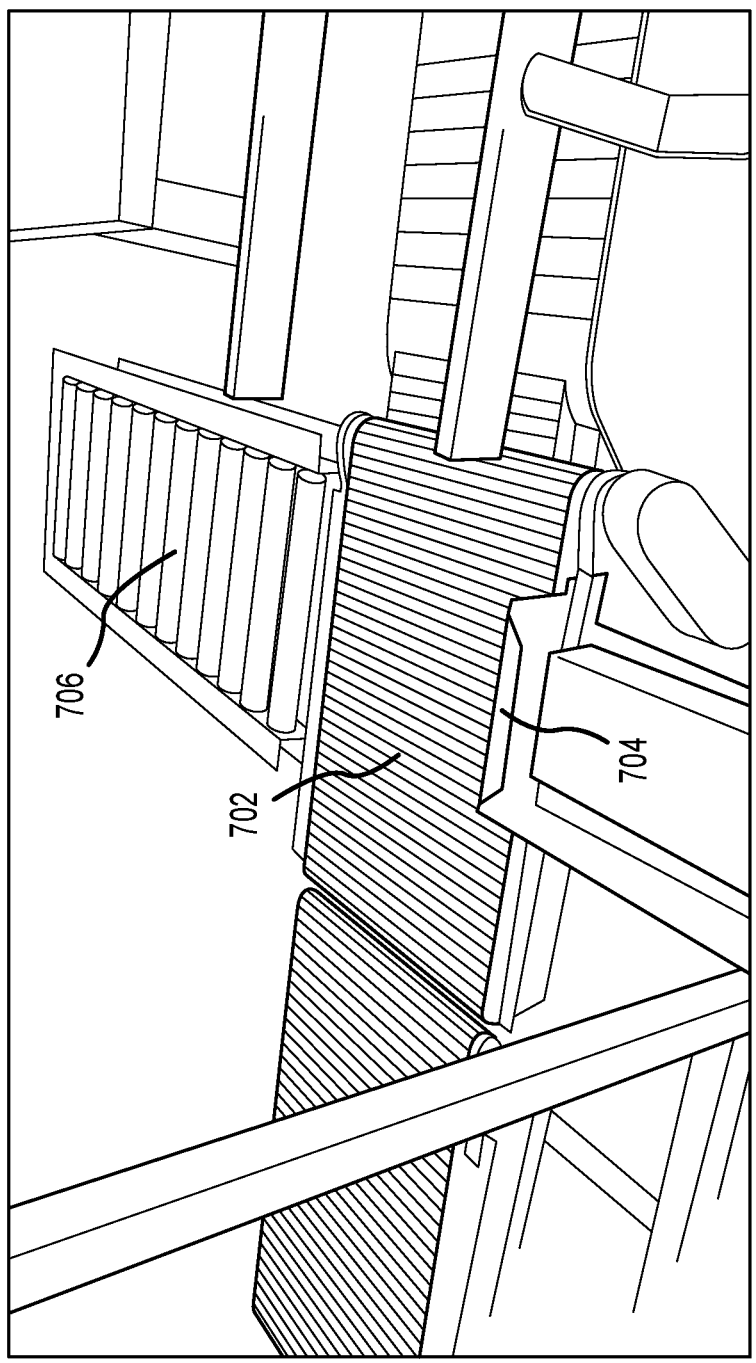
FIG. 6 is a perspective view of an actuator according to one embodiment of the present invention.

FIG. 6 illustrates a portion of conveyer 702 where boxes may be rejected if the weight of the box as measured by the scale 602 does not match an expected weight for the custom order. In order to reject the box that is one the portion of conveyer 702, an actuator 704 moves to push the box onto rollers 706. The rejected box may then be checked, emptied, changed, etc.

Figure 7:
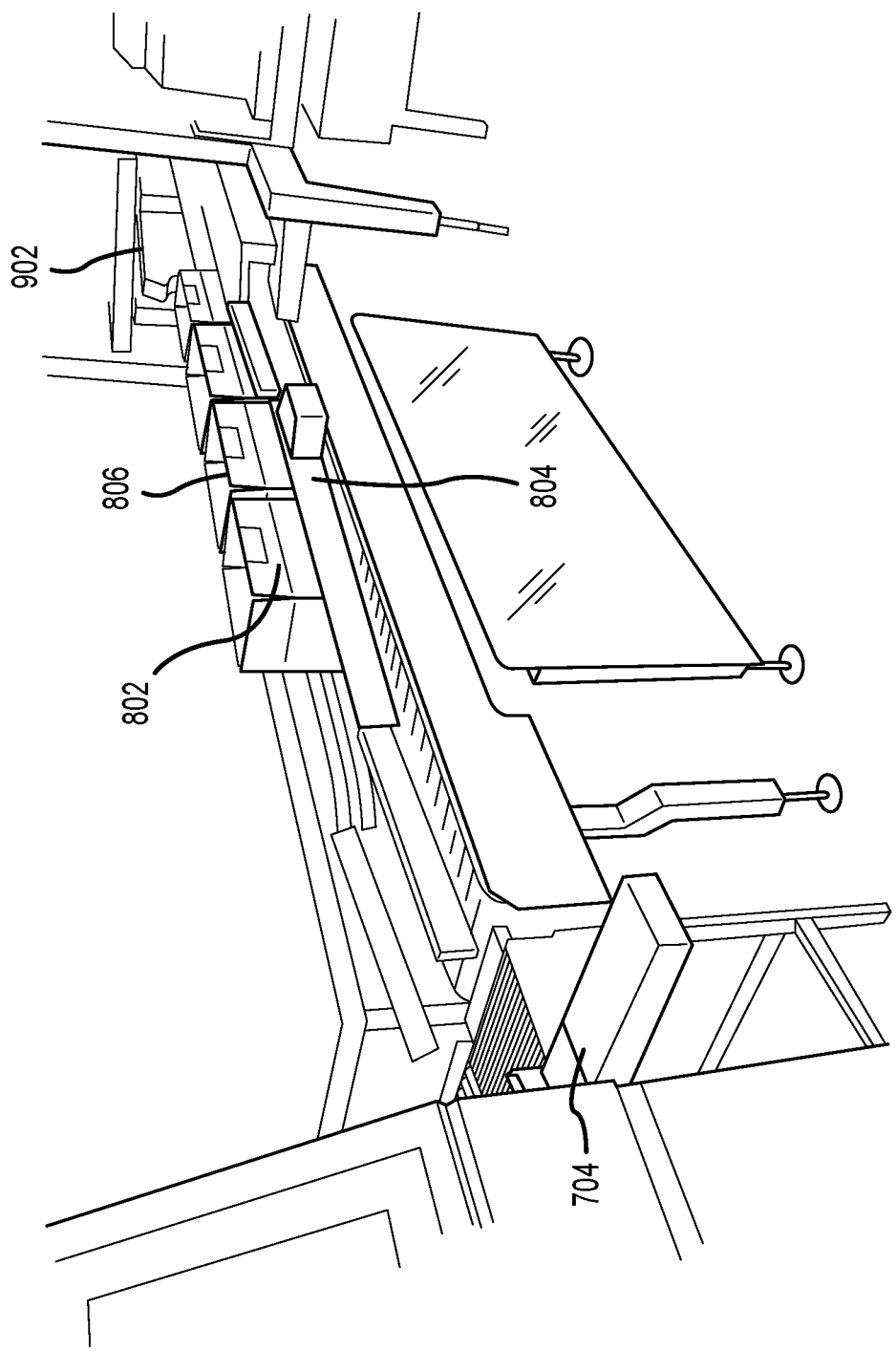
FIG. 7 is a perspective view of a box shaker according to one embodiment of the present invention.

FIG. 7 illustrates where boxes are shaken to settle the product within. For example, a shaker 804 may shake two boxes at a time, in this case boxes 802 and 806, to settle the product so the box may be properly sealed shut. The shaker 804 moves the boxes back and forth laterally across the conveyer to settle the product. FIG. 7 also shows another view of the actuator 704 from FIG. 6. FIG. 7 also shows a box closer 902. The box closer 902 may glue, tape, or otherwise seal a box closed after the product has been loaded into the box.

After a box is closed, a conveyer system moves the closed box to a shipping labeler 1002. The shipping labeler 1002 may also include a scanner that scans the label placed on the box by the labeler 402 of FIG. 3. That label includes information about the custom order (and may also include information about the contents of the box that were loaded into the box by the variety pack machine). In this way, as described herein, the shipping labeler 1002 may determine shipping information from a server (e.g., order admin server 114, BoM server 116, VPM server 124, the order processing system 108, the parcel service API 160) relating to the custom variety pack order and where and/or how to ship it. Once the shipping label is printed and placed on the closed box, the box may be transferred from the fulfillment location to a shipping company for shipment to the location specified by the consumer who placed the original order.

Figure 9:
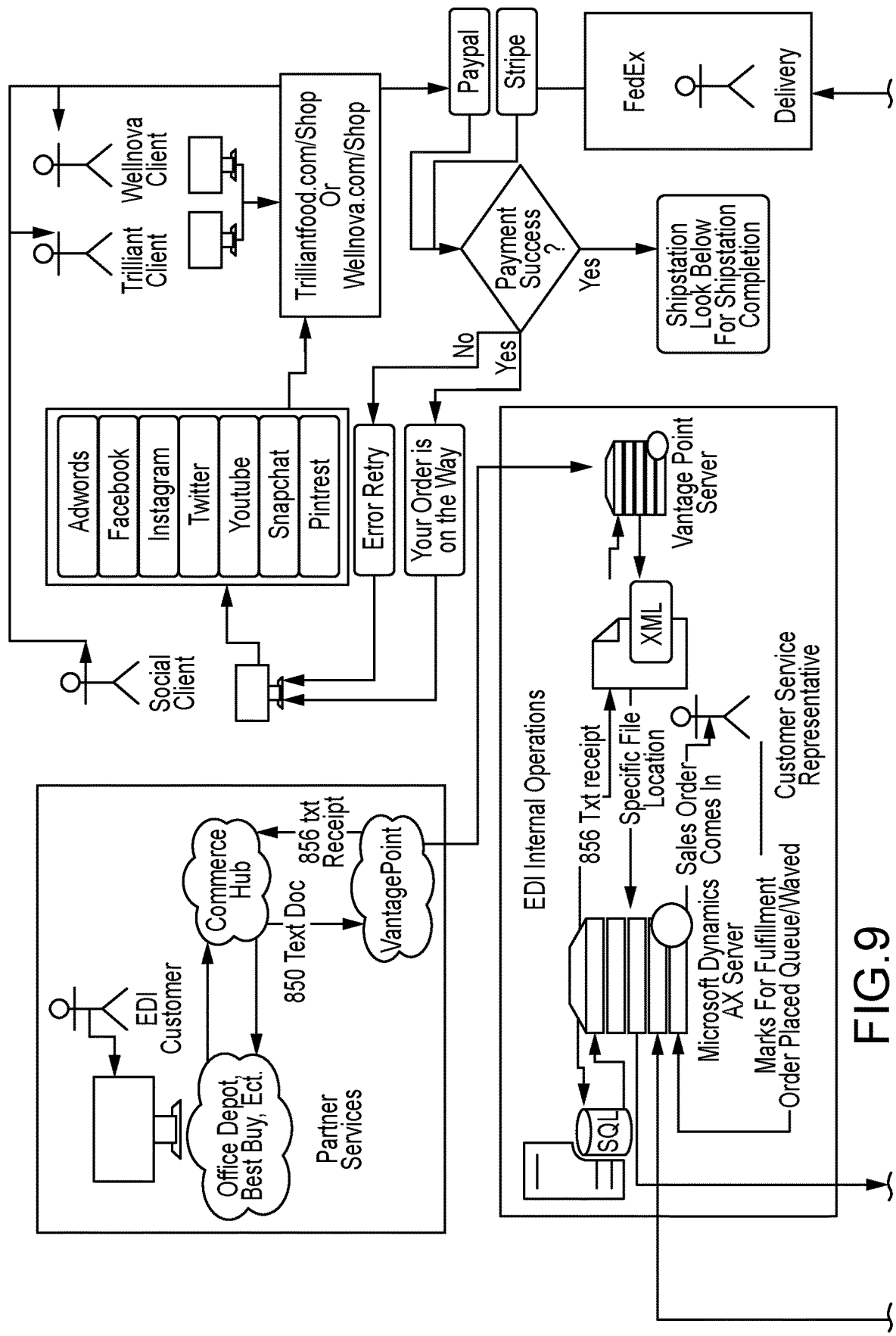
FIG. 9 is a process flow diagram for processing a custom order for a variety pack according to one embodiment of the present invention.
Figure 9:
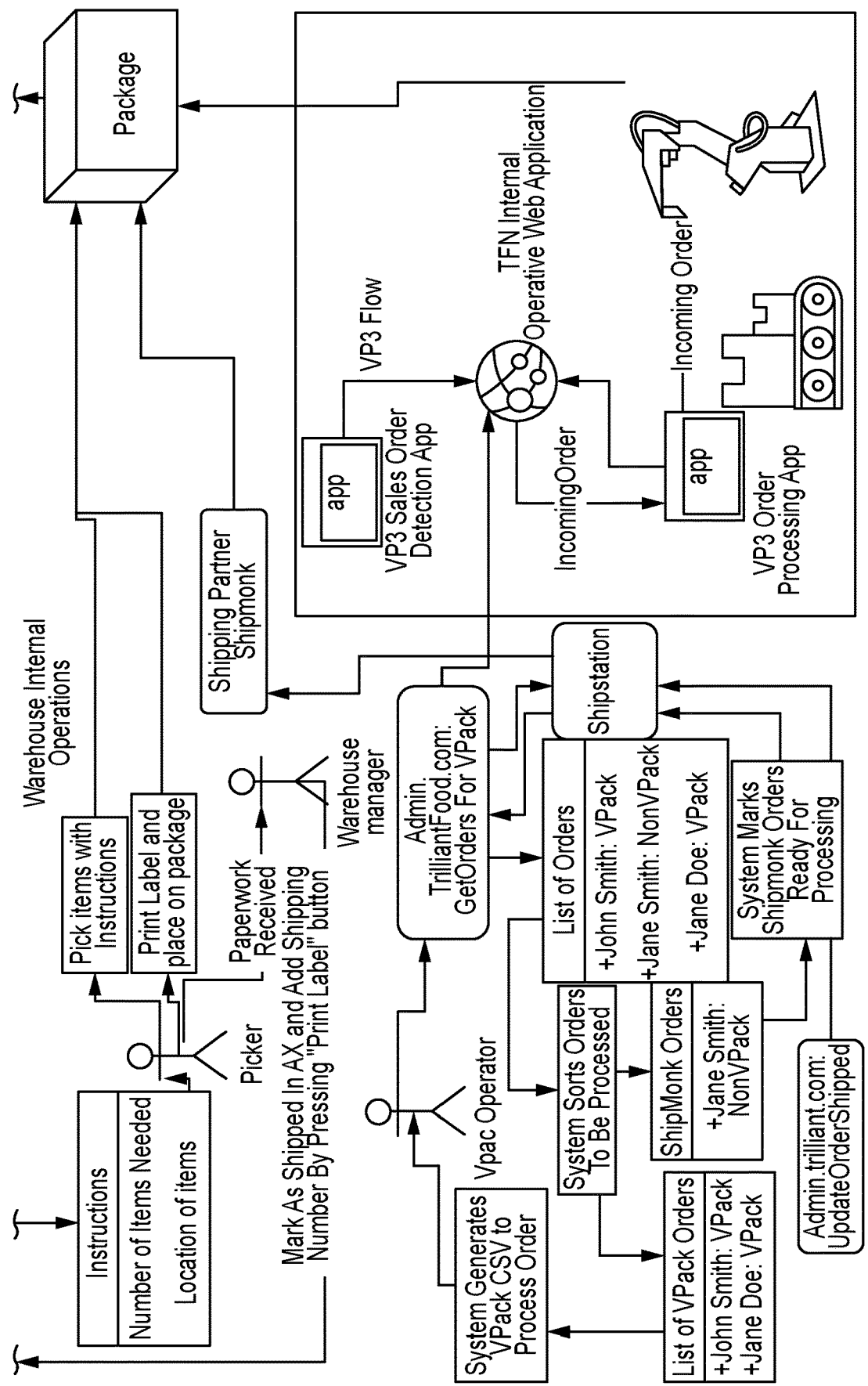
Figure 10:
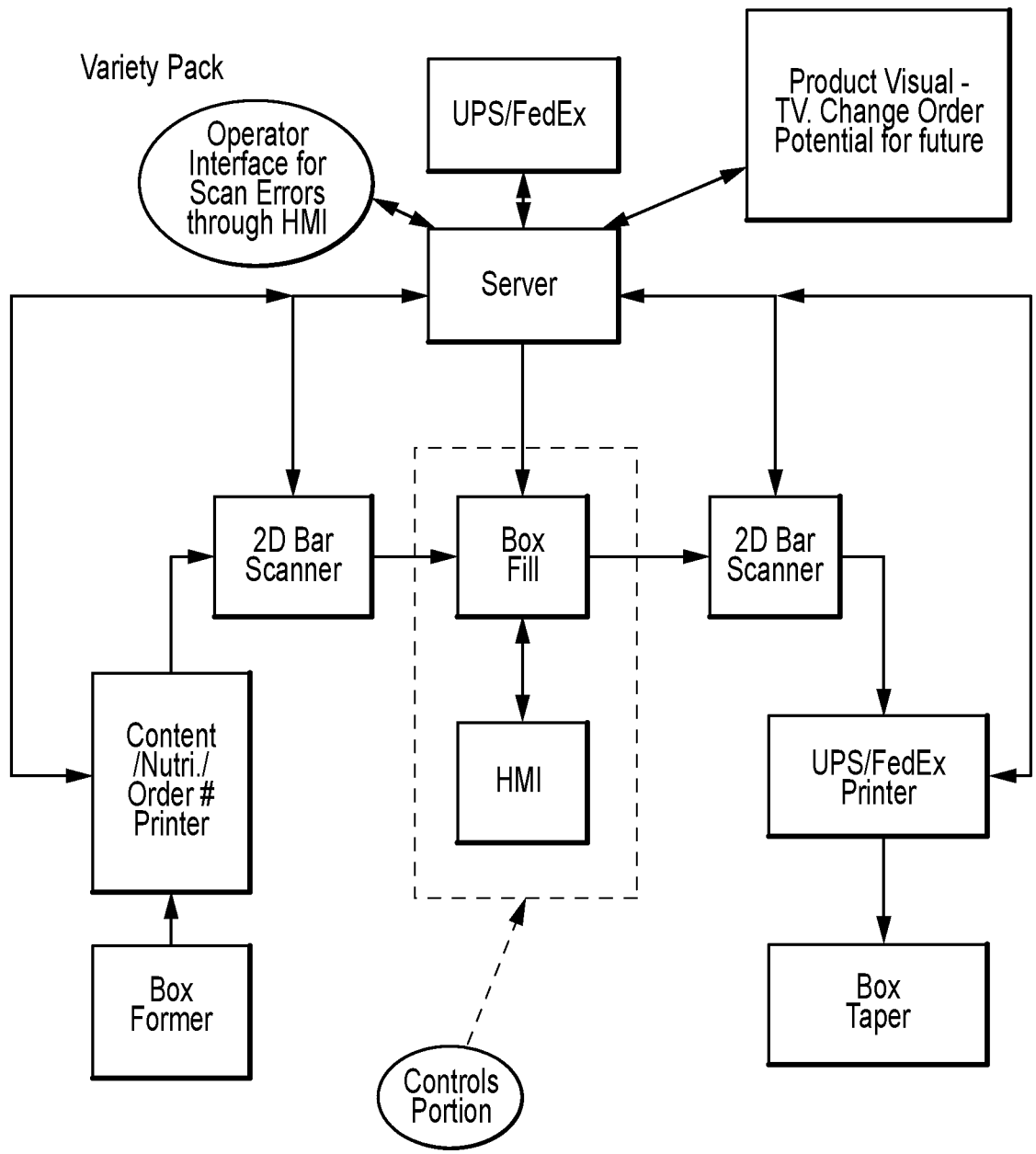
FIG. 10 is a process flow diagram for assembling a variety pack according to one embodiment of the present invention.
Figure 11:
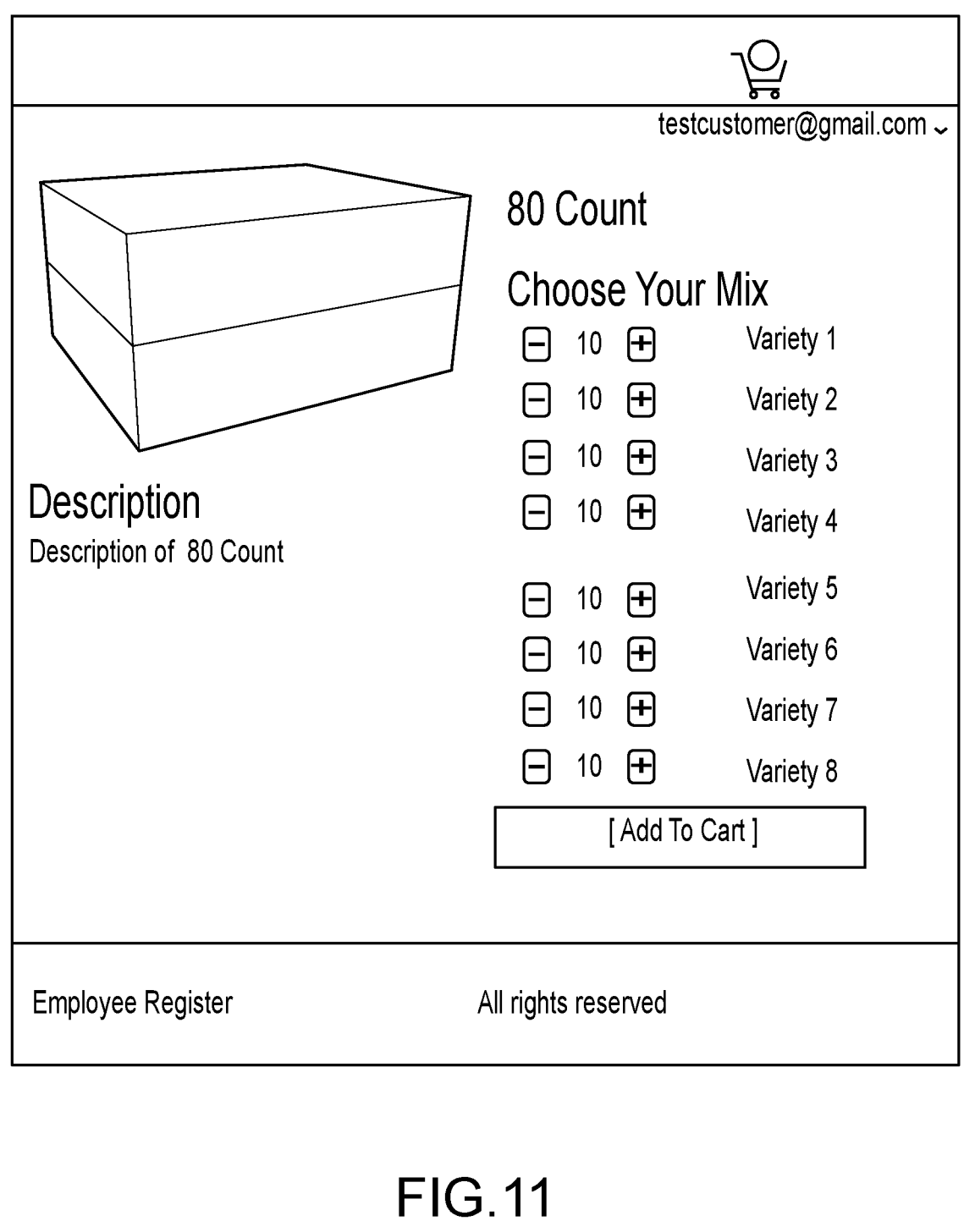
Figure 12:
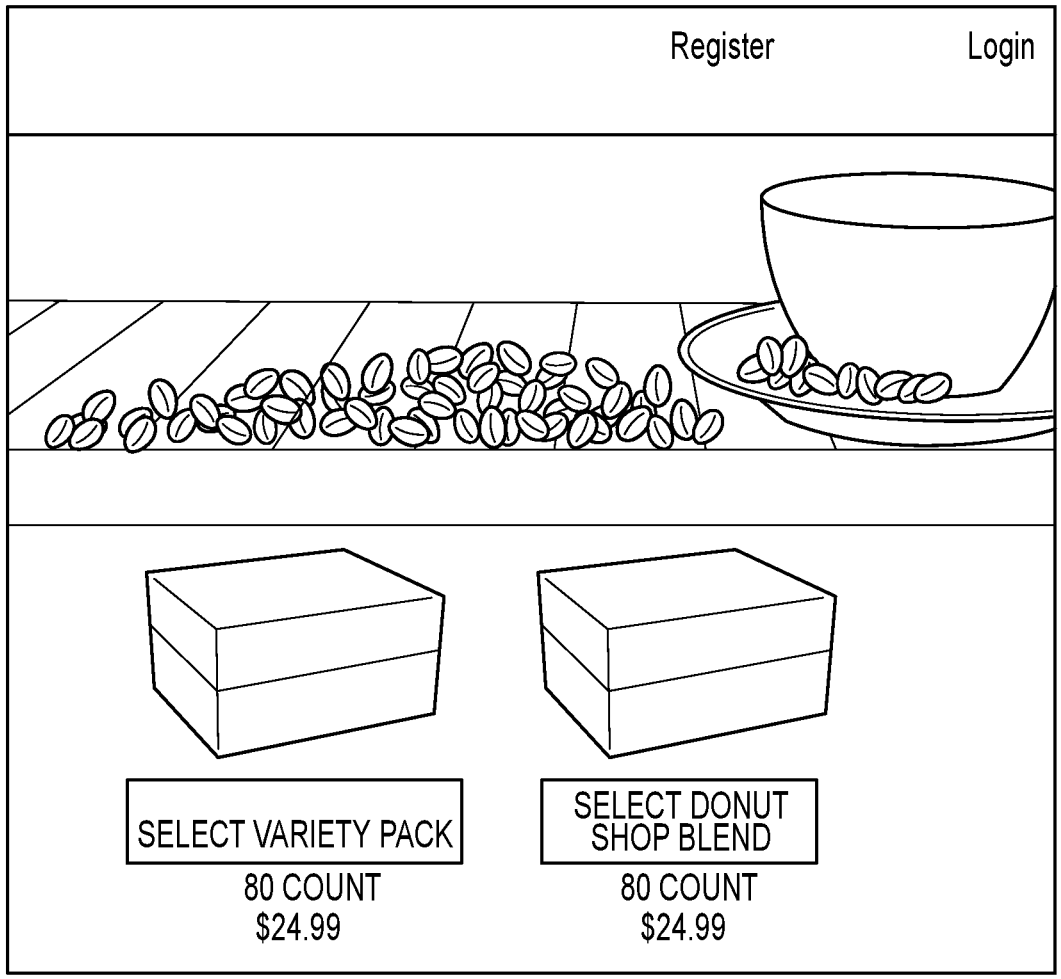
Figure 14:
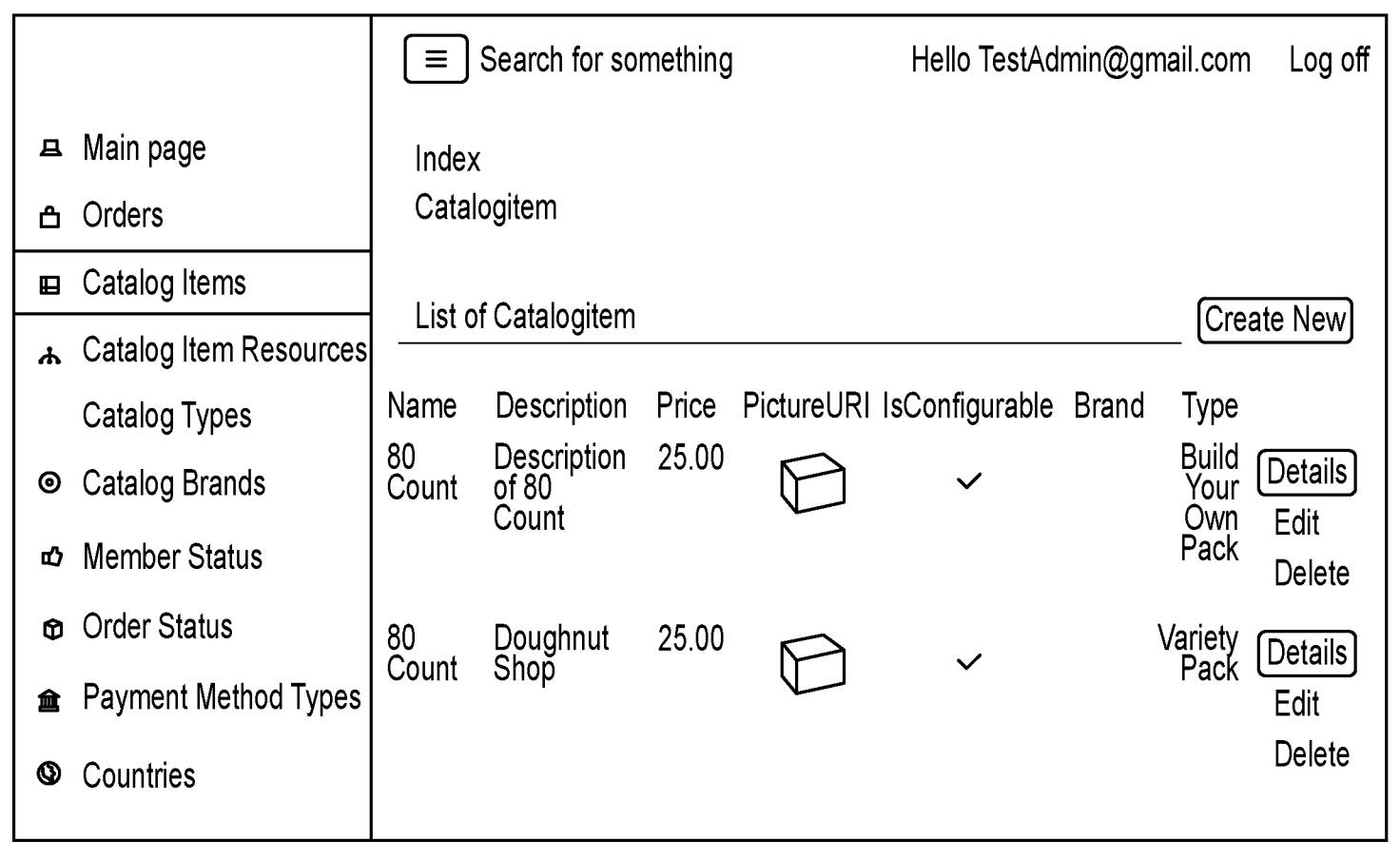
Figure 15:

FIG. 9 illustrates an embodiment of how orders for a customized product may be processed. FIG. 10 illustrates an embodiment for how a variety pack may be assembled. FIGS. 11-15 illustrate example user interfaces through which a consumer may place a customized order for a coffee pod variety pack. FIG. 11 illustrates a GUI that provides for ordering a custom variety pack of coffee pods. The particular GUI of FIG. 11 shows a custom variety pack order for coffee pods where ten coffee pods each of eight different varieties are currently selected. FIG. 12 demonstrates a GUI where a custom variety pack option may be selected by a user or a non-customizable pack option (e.g., donut shop blend) may be selected. FIG. 13 illustrates a GUI that demonstrates how, for a particular sized box of coffee pods, a consumer may be instructed to select the proper total number of coffee pods from a list of varieties. For example, on the left of FIG. 13, an 80 count box was selected by the consumer, but the user has selected 103 items (or 23 more than the box can fit). Accordingly, the user interface includes an instruction to remove 23 items. On the right of FIG. 13, an 80 count box was selected by the consumer, but the user has selected 67 items (or 13 short of the 80 count capacity). Accordingly, the user interface includes an instruction for the consumer to select 13 more items. FIG. 14 shows another GUI where, similar to FIG. 12, a custom variety pack or a non-customizable box of coffee pods may be selected. FIG. 15 shows another GUI where, like the examples of FIG. 13, a user may customize their own variety pack of coffee pods with up to eight different varieties.

In some embodiments, the methods, systems, apparatuses, graphical user interfaces, methods of manufacture, and computer readable media described herein may be implemented according to the features and equations below. In some embodiments, the methods, systems, apparatuses, graphical user interfaces, methods of manufacture, and computer readable media described herein may be implemented using the parts/components/devices listed in Exhibit A below.

As described herein, aspects and features of the variety pack machines according to the present invention and embodiments thereof may include various embodiments. Different numbers of cups may be ordered for a box. For example, customized 42, 80, and/or 96 cup boxes may be ordered. All three of those box counts may accommodate custom varieties of 8 flavors per order. The addition of metal/aluminum/plastic fingers on vibration channels of variety packing machine as described herein may be used to control cup flow to obtain better counts of cups. The fingers advantageously produce accurate counts of cups by letting one cup by at a time so that box contents are correct.

A server may communicate total cups per flavor needed for the day before production starts, which may be automated. For example, a CSV file may be used to communicate this information. This information may be complied using a queue of orders to be filled for a given day, and totaling the number of cups of each variety in those orders. A server may use tag names from csv file to lookup cup weight cross reference built into a data table for each flavor to calculate proper box weight for shipping purposes. A CSV with weight and dimensions for a number of orders (e.g., all the orders to be packed for a given day) may submitted to a shipping service so that tracking numbers may be acquired before production starts. In this way, the shipping labels may be completed without delay as the boxes are packed. In other words, a server that has received the tracking numbers form the shipping service may communicate shipping information to shipping label printer as orders are processed.

A variety packing machine such as those disclosed herein may include an operator human machine interface (HMI) that displays information, such as what flavor is designated to each of the 8 buckets of flavors on the machine. The HMI may include interfaces for an operator to change flavor designation on machine between lanes/buckets. For example, on one day Vanilla could be on lane one and the next Vanilla may be on lane five. The variety packing machine and its HMI may be ethernet capable, such that it may connect to a programming logic controller (PLC) through an ethernet connection.

For the labeler 402 described herein, an ID Tech 255 Printer may be used, for example. This labeler provides for automated label generation/application for the contents of a box. The labels applied to the box may be a 4"×6" label, or may be larger or smaller. The label may include the number of each quantity and flavor. The labeler may print the label and may detect that a label has been successfully applied to a box. The labeler may utilize an air line type labeler to blow the labels onto the boxes for pressure sensitive applications. The labeler may also be ethernet connected so it may communicate with servers, and may include a low label alarm so that an alert may be sent when labels are running low. In this way, filling of variety packs will not be slowed down for downtime of the labeler. A Zebra® brand print engine capable of printing bar codes onto the labels may be used.

For a shipping labeler, such as the labeler 1002, an ID Tech 255 Printer may also be used to automatically generate and apply a shipping label. For example, a 4"×6" label may be used, or other sizes may be used. A human operator of a variety pack machine therefore may not have create labels for shipping. Similarly, air lines, ethernet connections, and Zebra® brand print engines may be used for the shipping labeler as well.

Various servers may also be used according to the various embodiments described herein. Such servers may communicate with shipping service servers, such as United Parcel Service (UPS™) world ship servers. The servers of the embodiments herein may access the internet to communicate with other servers, may be upgradeable for potential to add additional systems, variety packing machines, variety pack ordering platforms, etc. in the future. The servers may also be configured to interface with PLCs, HMIs, two dimensional (2D) scanners, inline scales, and any other components used to pack end-consumer customizable variety packs as described herein. Servers may also use a file, such as a CSV file, to create box content labels with a 2D bar code containing order number that a scanner (e.g., the scanner 502) used in conjunction with a variety packing machine scans. The system may use that order number to look up order details for filling the order. In this way, boxes may be reorganized on a conveyor line before reaching a variety packing machine, but boxes are filled correctly as they arrive at the variety packing machine, reducing errors and downtime of the conveyor line. A server may also receive information relating to a scan of a label on a box while it is on or entering an inline scale such as the scale 602. In this way, the server may look up or calculate an expected weight of a particular order (e.g., look up the expected weight in the CSV file) and compare to the value output by the scale to ensure that the weight of the box is acceptable.

2D scanners may also be used. For example, a 2D scanner such as the scanner 502 may be used to read an order barcode as it enters box fill at a variety packing machine. A PLC may get order details from a server based on the order number read by the 2D scanner, and the PLC may then cause the variety packing machine to fill the box with the correct number and varieties of product. A 2D scanner may also be used to read an order barcode before an inline scale such as the scale 602. A server may then compare a weight measured by the inline scale to a calculated weight (e.g., determined from a CSV file of the orders) to ensure the order is correct. A box may then enter a shipping label printer area. An automated email to the customer that ordered the box may include the tracking number of their box and notifies the customer that the order was processed and fulfilled and has been sent out for shipping.

Equations

The following equations describes examples of ways in which a variety packing machine operates and various components and timed intervals in-between components that govern the data transmission of data from the end-consumer to the variety packing machine to generate a final package with shipping label. Initially, for flavor variety customization as described herein, a transmission through a client-server relationship may be used, where the client generates the original information for an order and the information is transmitted through a client connection to the server. The server then receives the data for the order and converts into the proper format to generate a work order that is specific to that user. That work order will result in a package of various goods assorted in the specifications and instructions dictated by the user. Once the order is filled as described herein, that package will then be shipped to the user.

Below are typical sets of equations that may govern functionality of the variety packing machine system, which may include variables such as encoding transmission of data and origins of data, change in time between each stage, number of label components, number of scanning components, number of optical components, number of oscillating components, order of components, order of optical components, order of oscillating components, order of label components, and/or output quantities.

Where an operational component may be a Label Component, Scanning component, Optical Component, Oscillating Component or another input or output device with operations used for operational success:

k=number of Operational Components on the line

I=$\{1, 2, 3, \ldots, k\}$: set of integers representing each Operational Component on the line R=$\{1, 2, 3, \ldots, k!\}$: set of integers representing each unique state Combination of all of the operational components $\bar{S}_j = \langle S_{R_j I_1}, S_{R_j I_2}, S_{R_j I_3}, \ldots, S_{R_j I_k} \rangle$: A specific unique combinational order configuration of the Operational Components $\bar{S}_{jx}$: is for a specific unique combinational state configuration of the Operational Components a specific operational component index $t(\bar{S}_{jx})$: is the time that the package arrives in the particular indexed operational component configured in the order set $\hat{S}_{jx}$ $\delta t_{jx}$: is the change in time from one location of the package indexed location where each indexed location correlates to the physical location of the particular operational component.

$$\delta t_{jx} = t(\bar{S}_{jx}) - t(\bar{S}_{j(x-1)})$$

T: is the Total Time duration in which it takes for a package to arrive at every indexed location in a particular state set $$T = \sum_{l=1}^{x} \delta t_{jl}$$

$$\bar{S} = \begin{bmatrix} S_{R_1 I_1} & \cdots & S_{R_1 I_k} \\ \vdots & \ddots & \vdots \\ S_{R_{k!} I_1} & \cdots & S_{R_{k!} I_k} \end{bmatrix};$$

Is the total state set, where each row of the matrix represents one of the unique combinational state configurations of the Operational Components.

For a particular line configuration $\bar{S}_j$ the information will be transmitted from a Prime mover, be it a end user or a 3$^{rd}$ party purchaser, with the data used for packaging and filling an order with the following data set that may include but is not limited to or required to contain: Ship to Street address, Ship to City, Ship to State, Ship to Zip code and the quantities by item for N items. A Particular example of this configuration may be as follows:

Where $k_1$=FIG. 2A 202 and $k_2$=FIG. 2A 204 . . . and $k_{46}$=FIG. 10 1002

$I=\{1,2,3,\ldots,46\}$ $R=\{1,2,3,\ldots,46!\}$ $\bar{S}_1 = \langle S_{R_1 I_1}, S_{R_1 I_2}, S_{R_1 I_3}, \ldots, S_{R_1 I_{46}} \rangle$ Where $\bar{S}_{1,1}$ is the first operational component in the first configuration set R And where $t(\bar{S}_{1,1})$ Is the time that the package arrives at the first operational component in the first configuration set R and $t(\overline{S}_{1,2})$ is the time that the package arrives to the second operational component in the first configuration set R $$\delta t_{1,2} = t(\overline{S}_{1,2}) - t(\overline{S}_{1,(2-1)})$$

In first configuration set R that is the current real-world configuration $\delta t_{1,2} \cong 380$ ms $$T = \sum_{l=1}^{46} \delta t_{1,l} \cong 293 \text{ seconds}$$

A total state set may then look like this matrix where the orders have changed of the operational components to achieve a similar outcome:

$$\overline{S} = \begin{bmatrix} S_{R_1 l_1} & \cdots & S_{R_1 l_{46}} \\ \vdots & \ddots & \vdots \\ S_{R_{46!} l_1} & \cdots & S_{R_{46!} l_{46}} \end{bmatrix}$$

Then depending upon what state configuration of the operational components was selected, to complete an order with N items labeled with proper data would be the total time T.

Exhibit A

Example Component/Parts List

Allen Bradley Compact Logix 5370.
  (2) P/N 1769-L30ER Controller
  (2) P/N 1769-IA16 Digital Input
  (2) P/N 1769-OA16 VAC Output
  (2) P/N 1769-PA4 Power Supply
  (2) P/N 1769-ECR (End Cap Terminators)
  Reuse existing VAC Output
  Reuse existing Analog Output
Allen Bradley HMI
  15" screen
Pedestal Stand for Industrial PC
  (1) P/N RTL-6106300—Stand
  (1) P/N RTL-6315400—Enclosure
  (1) P/N RTL-6206300—Coupler
Allen Bradley managed switch (10 port)
  (1) PN A-B 1783-BMS10CGN
DC power supply and fusing for line and load wiring
  (1) P/N A-B 1606-XLE80E
  (1) Fuse
  (1) Fuse Holder
Printer—(2)
  Model 255—ID Technology
  Support Stand
  Low Label Alarm
Server
  HA Server—600 GB, 96 GB RAM, 16vCPU cores
  Microsoft windows server 2016 standard—license
  SQL Server 2016—License
  BarTender—Standard 3 printer licenses
(2) Scanner—2D
  Keyence SR-750
  Scanner management software

What is claimed is:

1. An apparatus for filling packages with a predefined assortment of a variety of different products, wherein the predefined assortment includes a first plurality of individual products of a first type and a second plurality of individual products of a second type, wherein the first type is different than the second type, the apparatus comprising:
  a controller configured to automatically receive information including a predetermined total weight for a predetermined number of individual products of the first type from a server and, based on the received information, automatically transmit a signal, wherein the predetermined number of individual products of the first type is selected based on a product order including the predefined assortment of the variety of different products, and wherein the predetermined number is more than one;
  a vibrating channel having a first end and a second end, wherein:
    the vibrating channel is configured to vibrate in response to the signal automatically transmitted by the controller, wherein the first end receives the first plurality of individual products, and
    the vibrating channel is configured to move the first plurality of individual products from the first end to the second end;
  a mechanism positioned in an opening of the second end of the vibrating channel, wherein the mechanism is configured to limit passage of the first plurality of individual products exiting the vibrating channel such that only one individual product of the first plurality of individual products exits at a time while the vibrating channel is vibrating; and
  a hopper positioned to receive the first plurality of individual products exiting the vibrating channel, wherein the hopper includes a scale configured to determine a total weight of the first plurality of individual products deposited in the hopper,
  wherein the controller is configured to automatically transmit the signal to vibrate the vibrating channel until the predetermined number of the individual products of the first type having the predetermined total weight is deposited into the hopper,
  wherein the controller is configured to determine a number of the individual products of the first type in the hopper based on the total weight measured by the scale,
  wherein the hopper holds the first plurality of individual products until the total weight is at least the predetermined total weight, and
  wherein the hopper is configured to automatically deposit the first plurality of individual products into a container when the total weight is at least the predetermined total weight.

2. The apparatus of claim 1, further including a scanner, wherein the scanner is configured to scan a label on the container to identify a unique custom order number for the product order, and further wherein the controller:
  automatically sends the unique custom order number to the server, and
  automatically receives the information from the server in response to the sending of the unique custom order number.

3. The apparatus of claim 2, wherein the controller automatically transmits a second signal to the hopper that causes the hopper to automatically deposit the predetermined number of the individual products of the first type into the container after the controller has determined that the predetermined number of the individual products of the first type is in the hopper.

4. The apparatus of claim 1, wherein the second signal from the controller causes the hopper to open a door to automatically deposit the first plurality of individual products into the container after determining that the predetermined number of the individual products of the first type have been deposited in the hopper.

5. The apparatus of claim 1, wherein the vibrating channel is a first vibrating channel, and further wherein the signal from the controller further causes a second vibrating channel to vibrate to cause the first plurality of individual products to enter the first vibrating channel from the second vibrating channel.

6. The apparatus of claim 1, wherein the first plurality of individual products comprise at least one of single serve coffee pods, single serve espresso pods, pre-packaged bags of ground or whole coffee beans, pre-packed single serve filter bags with ground coffee, or coffee add-in products.

7. The apparatus of claim 1, wherein the controller is configured to receive information including a second predetermined total weight for a second predetermined number of individual products of the second type and, based on the received information, automatically transmit a second signal, wherein the second predetermined number is more than one, and wherein the apparatus further comprises:
a second vibrating channel having a first end and a second end, wherein:
the second vibrating channel is configured to vibrate in response to the second signal automatically transmitted by the controller, wherein the first end receives the second plurality of individual products, and
the second vibrating channel is configured to move the second plurality of individual products from the first end to the second end;
a second mechanism positioned in an opening of the second end of the second vibrating channel, wherein the second mechanism is configured to limit passage of the second plurality of individual products exiting the second vibrating channel such that only one individual product of the second plurality of individual products exits at a time while the second vibrating channel is vibrating; and
a second hopper positioned to receive the second plurality of individual products exiting the second vibrating channel, wherein the second hopper includes a second scale configured to determine a second total weight of the second plurality of individual products deposited in the second hopper,
wherein the controller is configured to automatically transmit the second signal to vibrate the second vibrating channel until the second predetermined number of the individual products of the second type having the second predetermined total weight is deposited into the second hopper,
wherein the controller is configured to determine a second number of the individual products of the second type in the second hopper based on the second total weight measured by the second scale,
wherein the second hopper holds the second plurality of individual products until the second total weight is at least the second predetermined total weight, and
wherein the second hopper is configured to automatically release the second plurality of individual products to the container when the second total weight is at least the second predetermined total weight.

8. An apparatus for filling packages with a predefined assortment of a variety of different products, the apparatus comprising:
a controller configured to automatically determine a predetermined total weight for a predetermined number of individual products and, based on the received information, automatically transmit a signal to deposit a plurality of individual products, wherein the predetermined number is more than one;
a hopper configured to receive the plurality of individual products being deposited; and
a separating mechanism positioned before the hopper, the separating mechanism configured to separate the plurality of individual products being deposited prior to entering the hopper such that only one individual product enters the hopper at a time and until the hopper receives the predetermined number of the individual products having the predetermined total weight,
wherein the hopper includes a scale configured to determine a total weight of the plurality of individual products deposited in the hopper,
wherein the controller is configured to determine a number of the individual products in the hopper based on the total weight measured by the scale and automatically transmit the signal to deposit the plurality of individual products until the predetermined number of the individual products having the predetermined total weight is deposited into the hopper,
wherein the hopper holds the plurality of individual products until the total weight is at least the predetermined total weight, and
wherein the hopper is configured to automatically deposit the plurality of individual products into a container when the total weight is at least the predetermined total weight.

9. The apparatus of claim 8, further comprising a first vibrating channel, wherein the first vibrating channel has a first end and a second end, wherein the first vibrating channel is configured to vibrate in response to the signal automatically transmitted by the controller to move the plurality of individual products from the first end to the second end,
wherein, based on the received information, the controller is configured to automatically transmit the signal to vibrate the first vibrating channel until the predetermined number of the individual products having the predetermined total weight is deposited into the hopper.

10. The apparatus of claim 9, further comprising a second vibrating channel,
wherein the second vibrating channel has a first end and a second end,
wherein the first end of the first vibrating channel is positioned to receive the plurality of individual products,
wherein the first end of the second vibrating channel is positioned to receive the plurality of individual products from the second end of the first vibrating channel, and
wherein the hopper is positioned to receive the plurality of individual products from the second end of the second vibrating channel.

11. The apparatus of claim 10, wherein the separating mechanism is positioned proximate to an opening at the second end of the second vibrating channel, wherein the separating mechanism is configured to separate the plurality of individual products exiting the second vibrating channel while the second vibrating channel is vibrating.

12. The apparatus of claim 10, further comprising:
a storage hopper, wherein the first end of the first vibrating channel is positioned to receive the plurality of individual products from the storage hopper, and wherein the storage hopper has a swinging sidewall proximate to the first end of the first vibrating channel.

13. The apparatus of claim 10, wherein at least one of the first vibrating channel and the second vibrating channel is angled downward from the respective first end to the respective second end.

14. An apparatus for filling packages with a predefined assortment of a variety of different products, the apparatus comprising:
a controller configured to automatically receive information including a first predetermined total weight for a first predetermined number of individual products from a server and, based on the received information, automatically transmit a first signal, wherein the predetermined number of individual products is selected based on a product order including the predefined assortment of the variety of different products, and wherein the first predetermined number is more than one; and
a first product line for a first individual product type, the first product line comprising:
a first hopper configured to receive a first plurality of individual products from a first vibrating channel configured to vibrate in response to the first signal automatically transmitted by the controller, wherein a first mechanism individually separates the first plurality of individual products prior to entering the first hopper until the first hopper receives a first predetermined number of the first plurality of individual products having a first predetermined total weight,
wherein the first hopper includes a first scale configured to determine a first total weight of the first plurality of individual products deposited in the first hopper,
wherein the controller is configured to determine a number of the first plurality of individual products in the first hopper based on the first total weight measured by the first scale and automatically transmit the first signal to deposit the first plurality of individual products until the first predetermined number of the individual products having the first predetermined total weight is deposited into the first hopper,
wherein the first hopper holds the first plurality of individual products until the first total weight is at least the first predetermined total weight, and
wherein the first hopper is configured to automatically release the first plurality of individual products to a container when the first total weight is at least the first predetermined total weight.

15. The apparatus of claim 14, further comprising:
a first combined conveyor belt configured to receive the first plurality of individual products from the first hopper at a first position on the first combined conveyor belt, wherein the controller is configured to automatically transmit a second signal to open a first door of the first hopper and deposit the first plurality of individual products onto the first combined conveyor belt when the first total weight is at least the first predetermined total weight; and
a final hopper configured to receive the first plurality of individual products from the first combined conveyor belt.

16. The apparatus of claim 15, wherein the controller is configured to receive information including a second predetermined total weight for a second predetermined number of individual products and, based on the received information, automatically transmit a third signal, wherein the second predetermined number is more than one, and wherein the apparatus further comprises:
a second product line for a second individual product type that is different from the first individual product type, the second product line comprising:
a second hopper configured to receive a second plurality of individual products from a second vibrating channel configured to vibrate in response to a third signal automatically transmitted by the controller, wherein a second mechanism individually separates the second plurality of individual products prior to entering the second hopper until the second hopper receives a second predetermined number of the second plurality of individual products having a second predetermined total weight,
wherein the second hopper includes a second scale configured to determine a second total weight of the second plurality of individual products deposited in the second hopper,
wherein the controller is configured to determine a number of the second plurality of individual products in the second hopper based on the second total weight measured by the second scale and automatically transmit the third signal to deposit the second plurality of individual products until the second predetermined number of individual products having the second predetermined total weight is deposited into the second hopper,
wherein the second hopper holds the second plurality of individual products until the second total weight is at least the second predetermined total weight, and
wherein the second hopper is configured to automatically release the second plurality of individual products to the container when the second total weight is at least the second predetermined total weight.

17. The apparatus of claim 16, wherein the first combined conveyor belt is configured to receive the second plurality of individual products from the second hopper at a second position on the first combined conveyor belt different from the first position, wherein the controller is configured to automatically transmit a fourth signal to open a second door of the second hopper and deposit the second plurality of individual products onto the first combined conveyor belt when the second total weight is at least the second predetermined total weight, and
wherein the final hopper is configured to receive the second plurality of individual products from the first combined conveyor belt.

18. The apparatus of claim 17, wherein the controller is configured to automatically transmit the second signal and the fourth signal such that the final hopper receives the first plurality of individual products from the first product line and the second plurality of individual products from the second product line together via the first combined conveyor belt.

19. The apparatus of claim 16, further comprising:
a second combined conveyor belt configured to receive the second plurality of individual products from the second hopper at a first position on the second combined conveyor belt, wherein the controller is configured to automatically transmit a fourth signal to open a second door of the second hopper and deposit the second plurality of individual products onto the second combined conveyor belt when the second total weight is at least the second predetermined total weight, wherein the final hopper is configured to receive the second plurality of individual products from the second combined conveyor belt.

20. The apparatus of claim 19, wherein the controller is configured to automatically transmit the second signal and the fourth signal in sequential order such that the final hopper receives the first plurality of individual products from the first product line via the first combined conveyor belt prior to receiving the second plurality of individual products from the second product line via the second combined conveyor belt.

* * * * *